United States Patent
Ebato et al.

(10) Patent No.: US 11,302,935 B2
(45) Date of Patent: Apr. 12, 2022

(54) FUEL CELL STACK, DUMMY CELL FOR FUEL CELL STACK, AND METHOD OF PRODUCING DUMMY CELL

(71) Applicant: HONDA MOTOR CO., LTD., Tokyo (JP)

(72) Inventors: Yutaka Ebato, Wako (JP); Takashi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

(21) Appl. No.: 16/391,359

(22) Filed: Apr. 23, 2019

(65) Prior Publication Data
US 2019/0334183 A1    Oct. 31, 2019

(30) Foreign Application Priority Data
Apr. 27, 2018 (JP) .............................. JP2018-086489

(51) Int. Cl.
| | |
|---|---|
| *H01M 8/0276* | (2016.01) |
| *H01M 8/0273* | (2016.01) |
| *H01M 8/0258* | (2016.01) |
| *H01M 8/0267* | (2016.01) |
| *H01M 8/241* | (2016.01) |

(Continued)

(52) U.S. Cl.
CPC ....... *H01M 8/0276* (2013.01); *H01M 8/0258* (2013.01); *H01M 8/0267* (2013.01); *H01M 8/0273* (2013.01); *H01M 8/241* (2013.01); *H01M 8/2457* (2016.02);

(Continued)

(58) Field of Classification Search
CPC ............. H01M 8/0276; H01M 8/2457; H01M 8/2483; H01M 8/0258; H01M 8/0267; H01M 8/0273; H01M 8/241; H01M 8/2475
See application file for complete search history.

(56) References Cited

U.S. PATENT DOCUMENTS

| 2006/0110649 A1 | 5/2006 | Nishiyama et al. | |
|---|---|---|---|
| 2013/0157175 A1* | 6/2013 | Sohma ..................... | H01M 8/10 429/535 |

FOREIGN PATENT DOCUMENTS

| JP | H0521077 A | * | 1/1993 | ............. Y02E 60/50 |
|---|---|---|---|---|
| JP | 4727972 | | 7/2011 | |

OTHER PUBLICATIONS

JP-H0521077A. English machine translation by EPO. Jan. 29, 1993. (Year: 1993).*

* cited by examiner

*Primary Examiner* — James Lee
(74) *Attorney, Agent, or Firm* — Amin, Turocy & Watson, LLP

(57) ABSTRACT

In a fuel cell stack, a stack body includes a plurality of power generation cells stacked in a stacking direction, and a first dummy cell is provided at one end of the stack body in the stacking direction. The first dummy cell includes a dummy assembly, a dummy resin frame member, and a dummy joint separator. The dummy resin member includes a first resin sheet and a second resin sheet. An inner exposed portion is provided in an inner periphery of the first resin sheet. The inner exposed portion extends inward beyond an inner end of the second resin sheet. A first heat welding portion is provided discontinuously in a stack part where the inner exposed portion and the first electrically conductive porous sheet of the dummy assembly are stacked together. The (Continued)

dummy resin frame member and the dummy assembly are joined together by the first heat welding portion.

14 Claims, 10 Drawing Sheets

(51) Int. Cl.
    *H01M 8/2475*     (2016.01)
    *H01M 8/2483*     (2016.01)
    *H01M 8/2457*     (2016.01)
    *H01M 8/04223*     (2016.01)
    *H01M 8/04089*     (2016.01)

(52) U.S. Cl.
    CPC ....... *H01M 8/2475* (2013.01); *H01M 8/2483* (2016.02); *H01M 8/04089* (2013.01); *H01M 8/04268* (2013.01)

FUEL CELL STACK, DUMMY CELL FOR FUEL CELL STACK, AND METHOD OF PRODUCING DUMMY CELL

CROSS-REFERENCE TO RELATED APPLICATION

This application is based upon and claims the benefit of priority from Japanese Patent Application No. 2018-086489 filed on Apr. 27, 2018, the contents of which are incorporated herein by reference.

BACKGROUND OF THE INVENTION

Field of the Invention

The present invention relates to a fuel cell stack including a stack body formed by stacking a plurality of power generation cells in a stacking direction and a dummy cell provided at least at one end of the stack body in the stacking direction. Further, the present invention relates to a dummy cell provided for the fuel cell stack, and a method of producing the dummy cell.

Description of the Related Art

For example, a solid polymer electrolyte fuel cell employs a membrane electrode assembly (MEA) including an electrolyte membrane, an anode provided on one surface of the electrolyte membrane, and a cathode provided on the other surface of the electrolyte membrane. The electrolyte membrane is a polymer ion exchange membrane. The membrane electrode assembly is sandwiched between separators to form a power generation cell, and a plurality of the power generation cells are stacked together to form a stack body. Power collecting terminals for collecting electric charges generated by power generation in each of the power generation cells, and end plates for holding the power generation cells in the stacked state are provided at both ends of the stack body in the stacking direction to form a fuel cell stack.

Since heat dissipation from ends of the stack body in the stacking direction (hereinafter also simply referred to as the end(s) or the end side(s)) is facilitated through terminal plates, etc., the end sides of the stack body in the stacking direction tend to have low temperature in comparison with the central side of the stack body in the stacking direction. When the temperature of the end sides of the stack body becomes low due to influence of the outside temperature, etc., and water condensation occurs, there is a concern that reactant gases are not diffused smoothly, and the desired power generation stability of the fuel cell stack may not be achieved.

In an attempt to address the problem, for example, in a fuel cell stack disclosed in Japanese Patent No. 4727972, so called dummy cells are provided at least at one end of the stack body in the stacking direction. In the dummy cells, since metal plates are used instead of electrolyte membranes, power generation is not performed, and water is not produced. Therefore, the dummy cells themselves function as heat insulating layers between the terminal plates and the stack body. Thus, by providing the dummy cells as described above, it is possible to suppress decrease in the temperature at the end of the stack body. That is, it is possible to reduce the influence of the outside temperature on the fuel cell stack, and improve the power generation stability.

SUMMARY OF THE INVENTION

A main object of the present invention is to provide a fuel cell stack which makes it possible to improve the power generation stability by a dummy cell which can be obtained with high quality at low cost.

Another object of the present invention is to provide a dummy cell for a fuel cell stack which can be obtained with high quality at low cost, and which makes it possible to improve the power generation stability of the fuel cell stack.

Still another object of the present invention is to provide a method of producing the dummy cell.

According to an embodiment of the present invention, a fuel cell stack is provided. The fuel cell stack includes a stack body and a dummy cell. The stack body includes a plurality of power generation cells stacked together in a stacking direction. Each of the power generation cells includes a membrane electrode assembly, a resin frame member provided around the membrane electrode assembly, and separators sandwiching the membrane electrode assembly. The membrane electrode assembly includes an electrolyte membrane and electrodes having gas diffusion layers of electrically conductive porous sheets on both sides of the electrolyte membrane. The dummy cell is provided at least at one end of the stack body in the stacking direction. The dummy cell includes a dummy assembly corresponding to the membrane electrode assembly, a dummy resin frame member provided around the dummy assembly, and dummy separators sandwiching the dummy assembly. The dummy assembly includes two electrically conductive porous sheets that are stacked together. The dummy resin frame member includes two frame shaped resin sheets that are stacked together. An inner periphery of one of the resin sheets extends inward beyond an inner end of another of the resin sheets, and the dummy resin frame member and the dummy assembly are joined together by a heat welding portion provided discontinuously in a stack part where at least one of surfaces of an inner periphery of the one of the resin sheets and an outer periphery of the electrically conductive porous sheets are stacked together.

In the fuel cell stack, instead of the membrane electrode assembly of the power generation cell, the dummy cell including the dummy assembly is provided at least at one end of the stack body in the stacking direction. In the dummy cell, the dummy resin frame member is joined to the outer periphery of the dummy assembly by the heat welding portion. In the structure, unlike the case where the dummy resin frame member and the dummy assembly are joined together by adhesive, the adhesive does not stick out from the dummy resin frame member and the dummy assembly, and positional displacement of the adhesive does not occur. The dummy resin frame member and the dummy assembly can be joined together by a small joining margin with high degrees of accuracy and strength.

As a result, it becomes possible to improve the quality of the dummy cell and reduce the size of the dummy cell. Further, since the time for hardening the adhesive is not required, it is possible to improve the production efficiency of the dummy cell, and reduce the production cost of the dummy cell. Further, in the dummy cell where the dummy resin frame member and the dummy assembly are joined together by the heat welding portion provided discontinuously, unlike the dummy cell where the dummy resin frame member and the dummy assembly are joined together, it is possible to reduce energization losses which may occur during power generation of the fuel cell stack.

As described above, in the dummy cell formed by joining two electrically conductive porous sheets, since the electrolyte membrane and the electrode catalyst layers are not provided, power generation is not performed, and water is not produced in power generation. Therefore, the dummy cell itself functions as a heat insulating layer, and it is possible to suppress water condensation in the dummy cell. As described above, the dummy cell is provided at least at one end of the stack body in the stacking direction. In this manner, it is possible to improve the heat insulating performance at the end of the stack body. Therefore, even under the environment at low temperature, it is possible to suppress decrease in the temperature at the end of the stack body in comparison with the central position of the stack body. That is, it is possible to improve the power generation stability.

Further, since it is possible to improve the heat insulating performance at the end of the stack body, even in the case where operation of the fuel cell stack is started below the freezing temperature, it is possible to increase the entire temperature of the stack body suitably. In the structure, it is possible to eliminate or suppress situations where freezing of the water produced in power generation occurs at the end of the stack body to cause decrease in the voltage.

Therefore, in the fuel cell stack, using the dummy cell obtained with high quality at low cost, it is possible to improve the power generation stability of the fuel cell stack.

According to another embodiment of the present invention, a fuel cell stack is provided. The fuel cell stack includes a stack body and a dummy cell. The stack body includes a plurality of power generation cells stacked together in a stacking direction. Each of the power generation cells includes a membrane electrode assembly, a resin frame member provided around the membrane electrode assembly, and separators sandwiching the membrane electrode assembly. The membrane electrode assembly includes an electrolyte membrane and electrodes having gas diffusion layers of electrically conductive porous sheets on both sides of the electrolyte membrane. The dummy cell is provided at least at one end of the stack body in the stacking direction. The dummy cell includes a dummy assembly corresponding to the membrane electrode assembly, a dummy resin frame member provided around the dummy assembly, and dummy separators sandwiching the dummy assembly. The dummy assembly includes two electrically conductive porous sheets that are stacked together. The dummy resin frame member is formed of a single frame shaped resin sheet. The dummy resin frame member and the dummy assembly are joined together by a heat welding portion provided discontinuously in a stack part where at least one of surfaces the dummy resin frame member and an outer periphery of the electrically conductive porous sheets are stacked together.

Also in this fuel cell stack, since the dummy resin frame member and the dummy assembly are joined together by the heat welding portion, for example, in comparison with the case where the dummy resin frame member and the dummy assembly are joined together by adhesive, it is possible to obtain the fuel cell stack with high quality at low cost. Further, this dummy cell is provided at least at one end of the stack body in the stacking direction. In the structure, it is possible to reduce the influence of the outside temperature on the fuel cell stack, and improve the power generation stability.

In the fuel cell stack, preferably, an inner periphery of the dummy resin frame member is interposed between two electrically conductive porous sheets that are stacked together, and the heat welding portion includes a first heat welding portion provided in a stack part where one surface of an inner periphery of the dummy resin frame member and an outer periphery of the one of the electrically conductive porous sheets are stacked together, and a second heat welding portion provided in a stack part where another surface of the inner periphery of the dummy resin frame member and an outer periphery of another of the electrically conductive porous sheets are stacked together. In this case, by the first heat welding portion and the second heat welding portion, since both surfaces of the dummy resin frame member and the two electrically conductive porous sheets are joined together, respectively, it becomes possible to join the dummy resin frame member and the dummy assembly with high strength to a greater extent.

In the fuel cell stack, preferably, the first heat welding portion and the second heat welding portion are provided at different positions in the stacking direction. In this case, for example, in comparison with the case where the first heat welding portion and the second heat welding portion are provided at the same position in the stacking direction, it is possible to suppress partial increase in the thickness of the dummy cell. Even if the dummy cell is stacked on the power generation cell, since it is possible to suppress local increase in the surface pressure in the power generation cell, and thus, it is possible to suppress formation of creeps in the electrolyte membrane, and improve the durability of the electrolyte membrane.

In the fuel cell stack, preferably, the first heat welding portion and the second heat welding portion are provided alternately in a peripheral direction of an outer periphery of the electrically conductive porous sheets. In this case, the dummy assembly and the dummy resin frame member can be joined together with sufficient strength in simple joining steps. Further, it is possible to effectively suppress local increase in the surface pressures of the power generation cell stacked on the dummy cell.

In the fuel cell stack, preferably, an oxygen-containing gas passage configured to allow an oxygen-containing gas to flow in the stacking direction of the stack body and a fuel gas passage configured to allow a fuel gas to flow in the stacking direction of the stack body extend through an outer portion of the dummy resin frame member. In the fuel cell stack, as described above, since the joining margin for joining the dummy resin frame member and the dummy assembly is reduced, it is possible to determine the design of providing the oxygen-containing gas passages and the fuel gas passages in the outer portion of the dummy resin frame member more freely.

In the fuel cell stack, preferably, the dummy resin frame member has same structure as the resin frame member of the power generation cell. In this case, the dummy resin frame member of the dummy cell has structure common to the resin frame member of the power generation cell. Therefore, the dummy cell can have even more simple and economical structure.

In the fuel cell stack, preferably, one of the electrically conductive porous sheets has same structure as the gas diffusion layer provided in one side of the electrolyte membrane of the power generation cell, and another of the electrically conductive porous sheets has same structure as the gas diffusion layer provided in another side of the electrolyte membrane of the power generation cell. In this case, the electrically conductive porous sheets of the dummy cell have structure common to the gas diffusion layers of the power generation cell. Therefore, the dummy cell can have even more simple and economical structure.

According to still another embodiment of the present invention, a dummy cell for the fuel cell stack is provided. The fuel cell stack includes a stack body and the dummy cell. The stack body includes a plurality of power generation cells stacked together in a stacking direction. Each of the power generation cells includes a membrane electrode assembly, a resin frame member provided around the membrane electrode assembly, and separators sandwiching the membrane electrode assembly. The membrane electrode assembly includes an electrolyte membrane and electrodes having gas diffusion layers of electrically conductive porous sheets on both sides of the electrolyte membrane. The dummy cell is provided at least at one end of the stack body in the stacking direction. The dummy cell includes a dummy assembly corresponding to the membrane electrode assembly, a dummy resin frame member provided around the dummy assembly, and dummy separators sandwiching the dummy assembly. The dummy assembly includes two electrically conductive porous sheets that are stacked together. The dummy resin frame member includes two frame shaped resin sheets that are stacked together, and an inner periphery of one of the resin sheets extends inward beyond an inner end of another of the resin sheets. The dummy resin frame member and the dummy assembly are joined together by a heat welding portion provided discontinuously in a stack part where at least one of surfaces of an inner periphery of the one of the resin sheets and an outer periphery of the electrically conductive porous sheets are stacked together.

In the dummy cell for the fuel cell stack, the dummy resin frame member and the dummy assembly are joined together by the heat welding portion. Therefore, for example, in comparison with the case where the dummy resin frame member and the dummy assembly are joined together by adhesive, it is possible to obtain the fuel cell stack with high quality at low cost. Further, this dummy cell is provided at least at one end of the stack body in the stacking direction. In the structure, it is possible to reduce the influence of the outside temperature on the fuel cell stack, and improve the power generation stability.

Further, according to still another embodiment of the present invention, a dummy cell for a fuel cell stack is provided. The fuel cell stack includes a stack body and the dummy cell. The stack body includes a plurality of power generation cells stacked together in a stacking direction. Each of the power generation cells includes a membrane electrode assembly, a resin frame member provided around the membrane electrode assembly, and separators sandwiching the membrane electrode assembly. The membrane electrode assembly includes an electrolyte membrane and electrodes having gas diffusion layers of electrically conductive porous sheets on both sides of the electrolyte membrane. The dummy cell is provided at least at one end of the stack body in the stacking direction. The dummy cell includes a dummy assembly corresponding to the membrane electrode assembly, a dummy resin frame member provided around the dummy assembly, and dummy separators sandwiching the dummy assembly. The dummy assembly includes two electrically conductive porous sheets that are stacked together. The dummy resin frame member is formed of a single frame shaped resin sheet. The dummy resin frame member and the dummy assembly are joined together by a heat welding portion provided discontinuously in a stack part where at least one of surfaces the dummy resin frame member and an outer periphery of the electrically conductive porous sheets are stacked together.

In the dummy cell for the fuel cell stack, the dummy resin frame member and the dummy assembly are joined together by the heat welding portion. Therefore, for example, in comparison with the case where the dummy resin frame member and the dummy assembly are joined together by adhesive, it is possible to obtain the dummy cell with high quality at low cost. Further, this dummy cell is provided at least at one end of the stack body in the stacking direction.

In the structure, it is possible to reduce the influence of the outside temperature on the fuel cell stack, and improve the power generation stability.

In the dummy cell for the fuel cell stack, preferably, an inner periphery of the dummy resin frame member is interposed between two electrically conductive porous sheets that are stacked together, and the heat welding portion includes a first heat welding portion provided in a stack part where one surface of an inner periphery of the dummy resin frame member and an outer periphery of the one of the electrically conductive porous sheets are stacked together, and a second heat welding portion provided in a stack part where another surface of the inner periphery of the dummy resin frame member and an outer periphery of another of the electrically conductive porous sheets are stacked together. In this case, it becomes possible to join the dummy resin member and the dummy assembly with high strength to a greater extent.

In the dummy cell for the fuel cell stack, preferably, the first heat welding portion and the second heat welding portion are provided at different positions in the stacking direction. In this case, even if the dummy cell is stacked on the power generation cell, it is possible to suppress local increase in the surface pressure in the power generation cell, and thus, it is possible to improve the durability of the electrolyte membrane.

In the dummy cell for the fuel cell stack, preferably, the first heat welding portion and the second heat welding portion are provided alternately in a peripheral direction of an outer periphery of the electrically conductive porous sheets. In this case, the dummy assembly and the dummy resin frame member can be joined together with sufficient strength in simple joining steps. Further, it become possible to suppress local increase in the surface pressure in the power generation cell stacked on the dummy cell.

In the dummy cell for the fuel cell stack, preferably, an oxygen-containing gas passage configured to allow an oxygen-containing gas to flow in the stacking direction of the stack body and a fuel gas passage configured to allow a fuel gas to flow in the stacking direction of the stack body extend through an outer portion of the dummy resin frame member. As described above, since the joining margin for joining the dummy resin frame member and the dummy assembly is reduced, it is possible to determine the design of providing the oxygen-containing gas passages and the fuel gas passages in the outer portion of the dummy resin frame member more freely.

In the dummy cell for the fuel cell stack, preferably, the dummy resin frame member has same structure as the resin frame member of the power generation cell. In this case, the dummy cell can have even more simple and economical structure.

In the dummy cell for the fuel cell stack, preferably, one of the electrically conductive porous sheets has same structure as the gas diffusion layer provided in one side of the electrolyte membrane of the power generation cell, and another of the electrically conductive porous sheets has same structure as the gas diffusion layer provided in another side of the electrolyte membrane of the power generation cell. In this case, the dummy cell can have even more simple and economical structure.

According to still another embodiment of the present invention, a method of producing a dummy cell is provided. The dummy cell is provided at least at one end of a stack body of a fuel cell stack in a stacking direction. The fuel cell stack includes the stack body and the dummy cell. The stack body includes a plurality of power generation cells stacked together in the stacking direction. Each of the power generation cells includes a membrane electrode assembly, a resin frame member provided around the membrane electrode assembly, and separators sandwiching the membrane electrode assembly. The membrane electrode assembly includes an electrolyte membrane and electrodes having gas diffusion layers of electrically conductive porous sheets on both sides of the electrolyte membrane. The method includes a joining step of joining a dummy assembly and a dummy resin frame member together to obtain a resin frame equipped dummy assembly in a manner that the dummy resin frame member is provided around the dummy assembly, the dummy assembly including two electrically conductive porous sheets that are stacked together, and corresponding to the membrane electrode assembly, the dummy resin frame member including frame shaped resin sheets, and a stacking step of sandwiching the resin frame equipped dummy assembly between the dummy separators to obtain the dummy cell. In the joining step, an inner periphery of the dummy resin frame member and an outer periphery of the electrically conductive porous sheets are stacked together to discontinuously form a heat welding portion to join the dummy resin frame member and the dummy assembly together.

In the method of producing the dummy cell, the dummy resin frame member and the dummy assembly are joined together by the heat welding portion. Therefore, for example, in comparison with the case where the dummy resin frame member and the dummy assembly are joined together by adhesive, it is possible to obtain the dummy cell with high quality at low cost. Since this dummy cell is provided at least at one end of the stack body in the stacking direction, it is possible to improve the power generation stability.

In the method of producing the dummy cell, preferably, in the joining step, the inner periphery of the dummy resin frame member is interposed between two electrically conductive porous sheets that are stacked together, and heat welding is applied to one surface of the inner periphery of the dummy resin frame member and an outer periphery of one of the electrically conductive porous sheets to form a first heat welding portion, and heat welding is applied to another surface of the inner periphery of the dummy resin frame member and an outer periphery of another of the electrically conductive porous sheets to form a second heat welding portion. In this case, it becomes possible to join the dummy resin member and the dummy assembly with high strength to a greater extent.

In the method of producing the dummy cell, preferably, in the joining step, the first heat welding portion and the second heat welding portion are formed in a manner that the first heat welding portion and the second heat welding portion are provided at different positions in the stacking direction. In this case, even if the dummy cell is stacked on the power generation cell, it is possible to suppress local increase in the surface pressure in the power generation cell, and thus, it is possible to improve the durability of the electrolyte membrane of the fuel cell stack.

In the method of producing the dummy cell, in the joining step, after the first heat welding portion is formed, the second heat welding portion may be formed to provide the first heat welding portion and the second heat welding portion alternately in a peripheral direction of an outer periphery of the electrically conductive porous sheets.

Further, in the method of producing the dummy cell, in the joining step, the first heat welding portion and the second heat welding portion may be formed alternately to provide the first heat welding portion and the second heat welding portion alternately in an outer periphery of the electrically conductive porous sheets in a peripheral direction.

In these cases, it is possible to join the dummy assembly and the dummy resin member with sufficient strength in simple joining steps, and suppress local increase in the surface pressure in the power generation cell.

In the method of producing the dummy cell, preferably, after the joining step, an oxygen-containing gas passage configured to allow an oxygen-containing gas to flow in the stacking direction of the stack body, a coolant passage configured to allow a coolant to flow in the stacking direction of the stack body, and a fuel gas passage configured to allow a fuel gas to flow in the stacking direction of the stack body are formed to extend through an outer portion of the dummy resin frame member. As described above, since the joining margin for joining a dummy resin frame member and the dummy assembly is reduced, it is possible to determine the design of providing the oxygen-containing gas passages and the fuel gas passages in the outer portion of the dummy resin frame member more freely.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
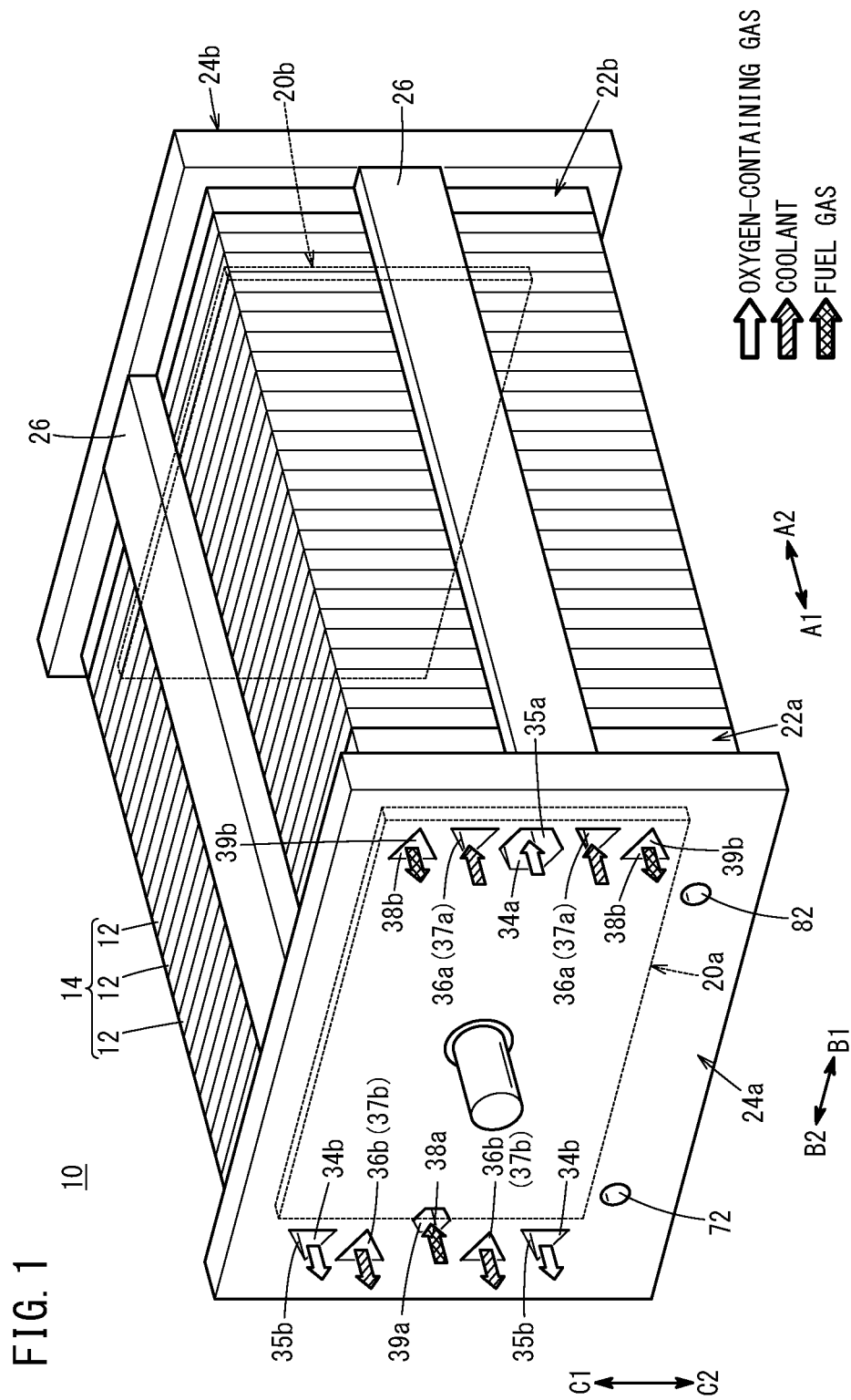
FIG. 1 is a perspective view showing a fuel cell according to an embodiment of the present invention.

A preferred embodiment of a fuel cell stack, a dummy cell for the fuel cell stack, and a method of producing a dummy cell according to the present invention will be described in detail with reference to the accompanying drawings. In the drawings, the constituent elements which have the same or similar functions and which offer the same or similar advantages are labeled with the same reference numerals, and description of such constituent elements may not be repeated.

Figure 2:
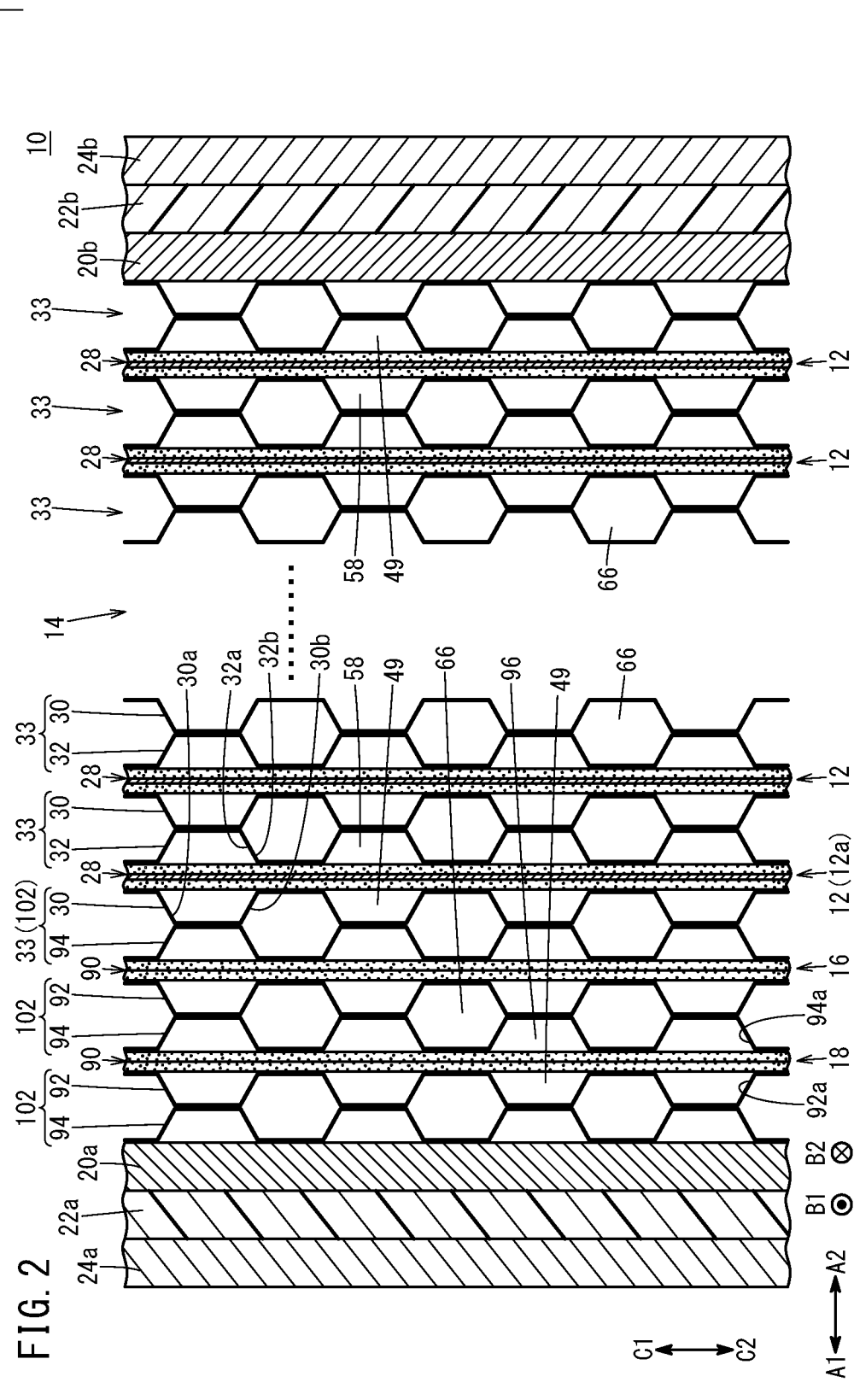
FIG. 2 is a cross sectional view showing main components of the fuel cell stack, taken in a stacking direction.

As shown in FIGS. 1 and 2, a fuel cell stack 10 according to the embodiment of the present invention includes a stack body 14 formed by stacking a plurality of power generation cells 12 in a horizontal direction (indicated by arrows A1 and A2) or in the gravity direction (indicated by arrows C1 and C2). For example, the fuel cell stack 10 is mounted in a fuel cell vehicle such as a fuel cell electric automobile (not shown).

As shown in FIG. 2, at one end of the stack body 14 in a stacking direction (one side (indicated by the arrow A1) in a direction indicated by the arrows A1, A2), a first dummy cell 16 is provided. A second dummy cell 18 is provided outside the first dummy cell 16. A terminal plate 20a is provided outside the second dummy cell 18. An insulator 22a is provided outside the terminal plate 20a. An end plate 24a is provided outside the insulator 22a. At the other end of the stack body 14 in the stacking direction (in the direction indicated by the arrow A2), a terminal plate 20b is provided. An insulator 22b is provided outside a terminal plate 20b. An end plate 24b is provided outside the insulator 22b. The insulators 22a, 22b are made of insulating material such as polycarbonate (PC) resin, phenol resin, etc.

As shown in FIG. 1, coupling bars 26 are provided between sides of rectangular end plates 24a, 24b. Both ends of each of the coupling bars 26 are fixed to inner surfaces of the end plates 24a, 24b using bolts (not shown) to apply a tightening load to a plurality of power generation cells 12 in the stacking direction indicated by arrows A1, A2. It should be noted that the fuel cell stack 10 may include a casing having the end plates 24a, 24b, and the stack body 14, etc. may be placed in the casing.

Figure 3:
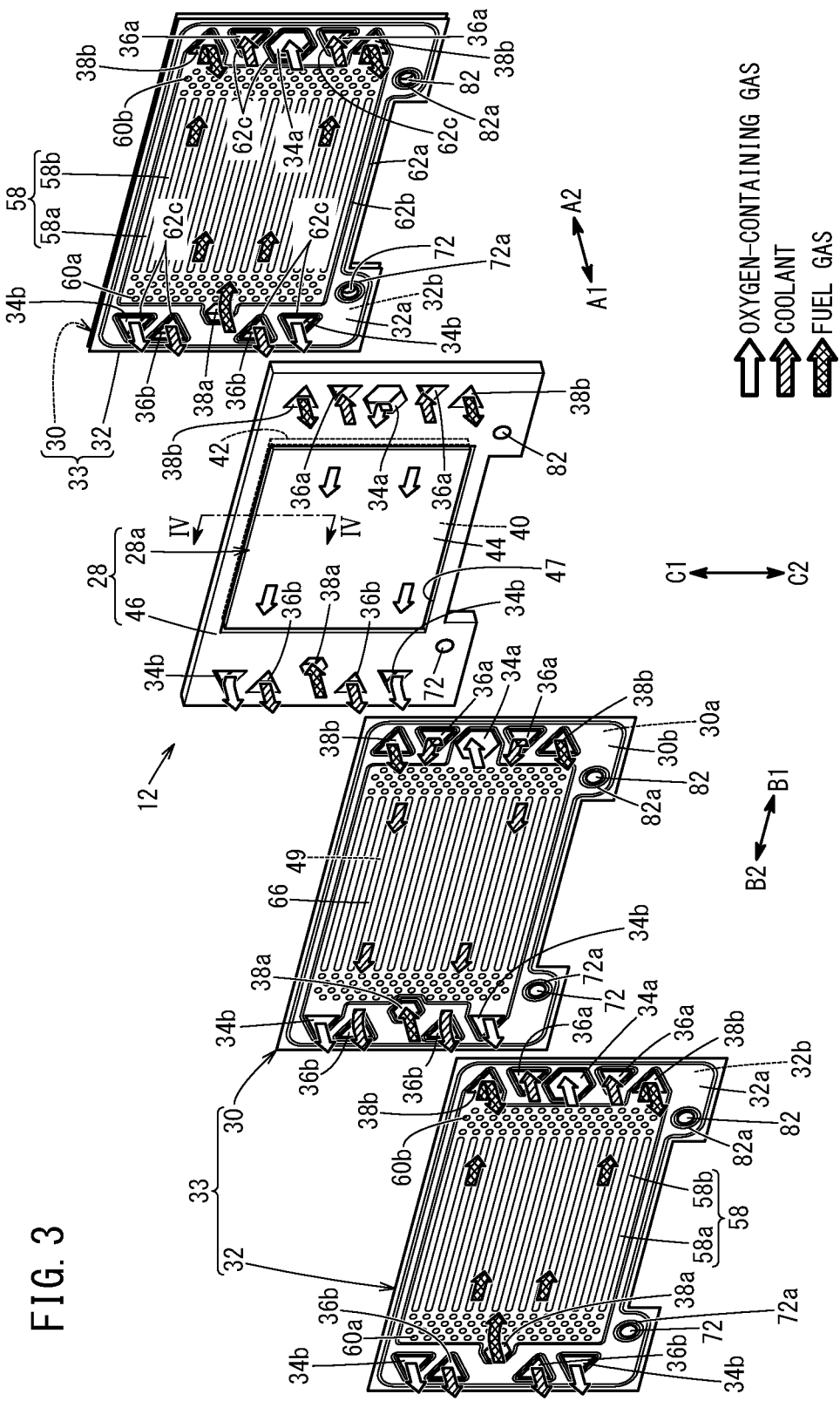
FIG. 3 is an exploded perspective view showing a power generation cell.

As shown in FIGS. 2 and 3, the power generation cell 12 includes a resin frame equipped MEA 28, and a first separator 30 and a second separator 32 sandwiching the resin frame equipped MEA 28. Each of the first separator 30 and the second separator 32 are in the form of a steel plate, a stainless steel plate, an aluminum plate, a plated steel plate or a thin metal plate, or metal plates having anti-corrosive surfaces by surface treatment, and formed by press forming, etc., to have a corrugated shape in cross section. Outer peripheries of the first separator 30 and the second separator 32 are joined together by welding, brazing, crimping, etc. to form a joint separator 33.

Figure 4:
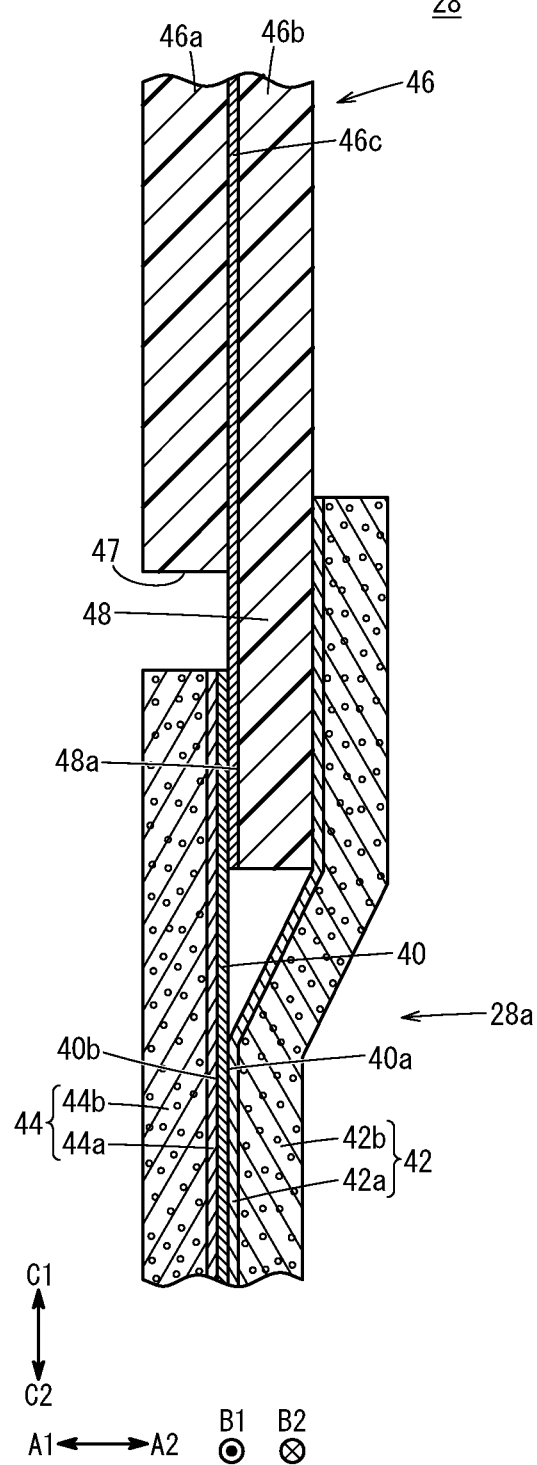
FIG. 4 is a cross sectional view taken along a line IV-IV in FIG. 3.

As shown in FIGS. 3 and 4, the resin frame equipped MEA 28 includes a membrane electrode assembly (MEA) 28a and a resin frame member 46 joined to, and provided around the outer periphery of the membrane electrode assembly 28a. The membrane electrode assembly 28a includes an electrolyte membrane 40, an anode 42 provided on one surface 40a (surface on a side indicated by the arrow A2) of the electrolyte membrane 40, and a cathode 44 provided on another surface 40b (surface on a side indicated by the arrow A1) of the electrolyte membrane 40. As shown in FIG. 4, in the embodiment of the present invention, the surface size of the cathode 44 is smaller than the surface size of the anode 42. Therefore, the membrane electrode assembly 28a is an MEA having different sizes of components. Further, the surface size of the electrolyte membrane 40 is the same as the surface size of the cathode 44. It should be noted that the surface size of the cathode 44 may be the same as the surface sizes of the anode 42 and the electrolyte membrane 40. The surface size of the anode 42 may be smaller than the surface size of the cathode 44 and the electrolyte membrane 40.

The electrolyte membrane 40 is a solid polymer electrolyte membrane (cation ion exchange membrane) such as a thin membrane of perfluorosulfonic acid containing water. A fluorine based electrolyte may be used for the electrolyte membrane 40. Alternatively, an HC (hydrocarbon) based electrolyte may be used for the electrolyte membrane 40.

The electrolyte membrane 40 is interposed between the anode 42 and the cathode 44.

The cathode 44 includes a cathode catalyst layer 44a joined to the surface 40b of the electrolyte membrane 40, and a cathode gas diffusion layer 44b stacked on the cathode catalyst layer 44a. The anode 42 includes an anode catalyst layer 42a joined to the surface 40a of the electrolyte membrane 40 and an anode gas diffusion layer 42b stacked on the anode catalyst layer 42a.

For example, the cathode catalyst layer 44a is formed by porous carbon particles deposited uniformly on the surface of the cathode gas diffusion layer 44b together with an ion conductive polymer binder and platinum alloy supported on the porous carbon particles. The anode catalyst layer 42a is formed by porous carbon particles deposited uniformly on the surface of the anode gas diffusion layer 42b together with an ion conductive polymer binder and platinum alloy supported on the porous carbon particles. Each of the cathode gas diffusion layer 44b and the anode gas diffusion layer 42b is formed of electrically conductive porous body such as carbon paper or carbon cloth, etc. A porous layer (not shown) may be provided in at least one of positions between the cathode catalyst layer 44a and the cathode gas diffusion layer 44b, and between the anode catalyst layer 42a and the anode gas diffusion layer 42b.

The resin frame member 46 includes a first resin sheet 46a and a second resin sheet 46b as two frame shaped resin sheets. The first resin sheet 46a and the second resin sheet 46b are stacked together by an adhesive layer 46c interposed between the stack surfaces of the first resin sheet 46a and the second resin sheet 46b. The outer size of the second resin sheet 46b is larger than the outer size of the first resin sheet 46a. An inner exposed portion 48 is provided in an inner periphery of the second resin sheet 46b. The inner exposed portion 48 extends inward beyond an inner end 47 of the first resin sheet 46a. The adhesive layer 46c is provided over the entire surface of the second resin sheet 46b including the inner exposed portion 48.

The inner exposed portion 48 of the resin frame member 46 is interposed between the electrolyte membrane 40 and the anode catalyst layer 42a in the outer portion of the membrane electrode assembly 28a. The adhesive layer 46c also covers a surface 48a of the inner exposed portion 48 adjacent to the electrolyte membrane 40. In the structure, the inner exposed portion 48 and the electrolyte membrane 40 are joined together by the adhesive layer 46c. Therefore, a resin frame member 46 is provided in the outer periphery of the membrane electrode assembly 28a.

For example, each of the first resin sheet 46a and the second resin sheet 46b is made of resin material such as PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

As shown in FIG. 3, at one end of the power generation cell 12 in the long side direction of the joint separator 33 and the resin frame member 46 (one side indicated by an arrow B1 of the direction indicated by arrows B1, B2), an oxygen-containing gas supply passage 34a, two coolant supply passages 36a, two fuel gas discharge passages 38b are provided. The oxygen-containing gas supply passage 34a, the plurality of the coolant supply passages 36a, and the plurality of fuel gas discharge passages 38b extend through the fuel cell stack 10 excluding the terminal plate 20b, the insulator 22b, and the end plate 24b.

For example, a fuel gas such as a hydrogen-containing gas is discharged through the fuel gas discharge passage 38b. For example, an oxygen-containing gas is supplied through the oxygen-containing gas supply passage 34a. A coolant is supplied through the coolant supply passages 36a.

These fluid passages are arranged in the vertical direction (indicated by arrows C1, C2). Specifically, the oxygen-containing gas supply passage 34a is positioned between the two coolant supply passages 36a that are provided vertically at a distance. One of two fuel gas discharge passages 38b is positioned above the upper coolant supply passage 36a, and the other of the two fuel gas discharge passages 38b is positioned below the lower coolant supply passages 36a.

At the other end of the power generation cell 12 in the long side direction of the first separator 30, the second separator 32, and the resin frame member 46 (one side indicated by an arrow B2), a fuel gas supply passage 38a, two coolant discharge passages 36b, and two oxygen-containing gas discharge passages 34b are provided. The fuel gas supply passage 38a, the two coolant discharge passages 36b, and the two oxygen-containing gas discharge passages 34b extend through the fuel cell stack 10 excluding the terminal plate 20b, the insulator 22b, and the end plate 24b.

The fuel gas is supplied through the fuel gas supply passage 38a. The coolant is discharged through the coolant discharge passages 36b. The oxygen-containing gas is discharged through the oxygen-containing gas discharge passages 34b. The fuel gas supply passage 38a and the fuel gas discharge passages 38b are also referred to as the fuel gas passages. Further, the oxygen-containing gas supply passage 34a and the oxygen-containing gas discharge passages 34b are also referred to as the oxygen-containing gas passages. Further, the coolant supply passages 36a and the coolant discharge passages 36b are also referred to as the coolant passages.

These fluid passages are arranged in the vertical direction. Specifically, the fuel gas supply passage 38a is positioned between the two coolant discharge passages 36b that are spaced from each other in the vertical direction. One of two oxygen-containing gas discharge passages 34b is positioned above the upper coolant discharge passage 36b, and the other of the two oxygen-containing gas discharge passages 34b is positioned below the lower coolant discharge passages 36b.

The layout of these fluid passages is not limited to the embodiment of the present invention, and may be changed as necessary depending on the required specification. Unlike the embodiment of the present invention, a pair of the coolant supply passages 36a may be provided on both sides of the fuel gas supply passage 38a in the vertical direction (indicated by the arrows C1, C2), and a pair of the coolant discharge passages 36b may be provided on both sides of the oxygen-containing gas supply passage 34a in the vertical direction. Further, in the embodiment of the present invention, the two fuel gas discharge passages 38b, the two oxygen-containing gas discharge passages 34b, the two coolant supply passages 36a, and the two coolant discharge passages 36b are provided, respectively. Alternatively, one fuel gas discharge passage 38b, one oxygen-containing gas discharge passage 34b, one coolant supply passage 36a, and one coolant discharge passage 36b may be provided, respectively.

The opening area of the oxygen-containing gas supply passage 34a is larger than the opening area of the fuel gas supply passage 38a. For example, the oxygen-containing gas supply passage 34a has a hexagonal shape as in the case of the illustrated embodiment. The oxygen-containing gas supply passage 34a may have a shape other than the hexagonal shape (e.g., rectangular shape). For example, a pair of oxygen-containing gas discharge passages 34b have a triangular shape as in the case of the illustrated embodiment. The oxygen-containing gas discharge passages 34b may have a triangular shape having rounded corners. Alternatively, the oxygen-containing gas discharge passages 34b may have a triangular shape having corners chamfered in a straight pattern (in effect, hexagonal shape).

As in the case of the illustrated embodiment, for example, the fuel gas supply passage 38a has a hexagonal shape. The fuel gas supply passage 38a may have a shape (e.g., rectangular shape) other than the hexagonal shape. For example, as in the case of the illustrated embodiment, the pair of fuel gas discharge passages 38b has a triangular shape. The fuel gas discharge passages 38b may have a triangular shape having rounded corners. Alternatively, the fuel gas discharge passages 38b may have a triangular shape having corners chamfered in a straight pattern (in effect, hexagonal shape).

For example, each of the pair of coolant supply passages 36a and the pair of coolant discharge passages 36b has a triangular shape. Each of the pair of coolant supply passages 36a and the pair of coolant discharge passages 36b has vertices of the triangle oriented toward an oxygen-containing gas flow field 49 and a fuel gas flow field 58. The pair of coolant supply passages 36a and the pair of coolant discharge passages 36b may have a triangular shape having rounded corners, or a triangular shape having corners chamfered in a straight pattern (in effect, hexagonal shape).

As shown in FIG. 1, the oxygen-containing gas supply passage 34a, the coolant supply passages 36a, and the fuel gas supply passage 38a are connected to inlets 35a, 37a, 39a provided in the end plate 24a, respectively. Further, the oxygen-containing gas discharge passages 34b, the coolant discharge passages 36b, and the fuel gas discharge passages 38b are connected to outlets 35b, 37b, 39b provided in the end plate 24a, respectively.

Figure 5:
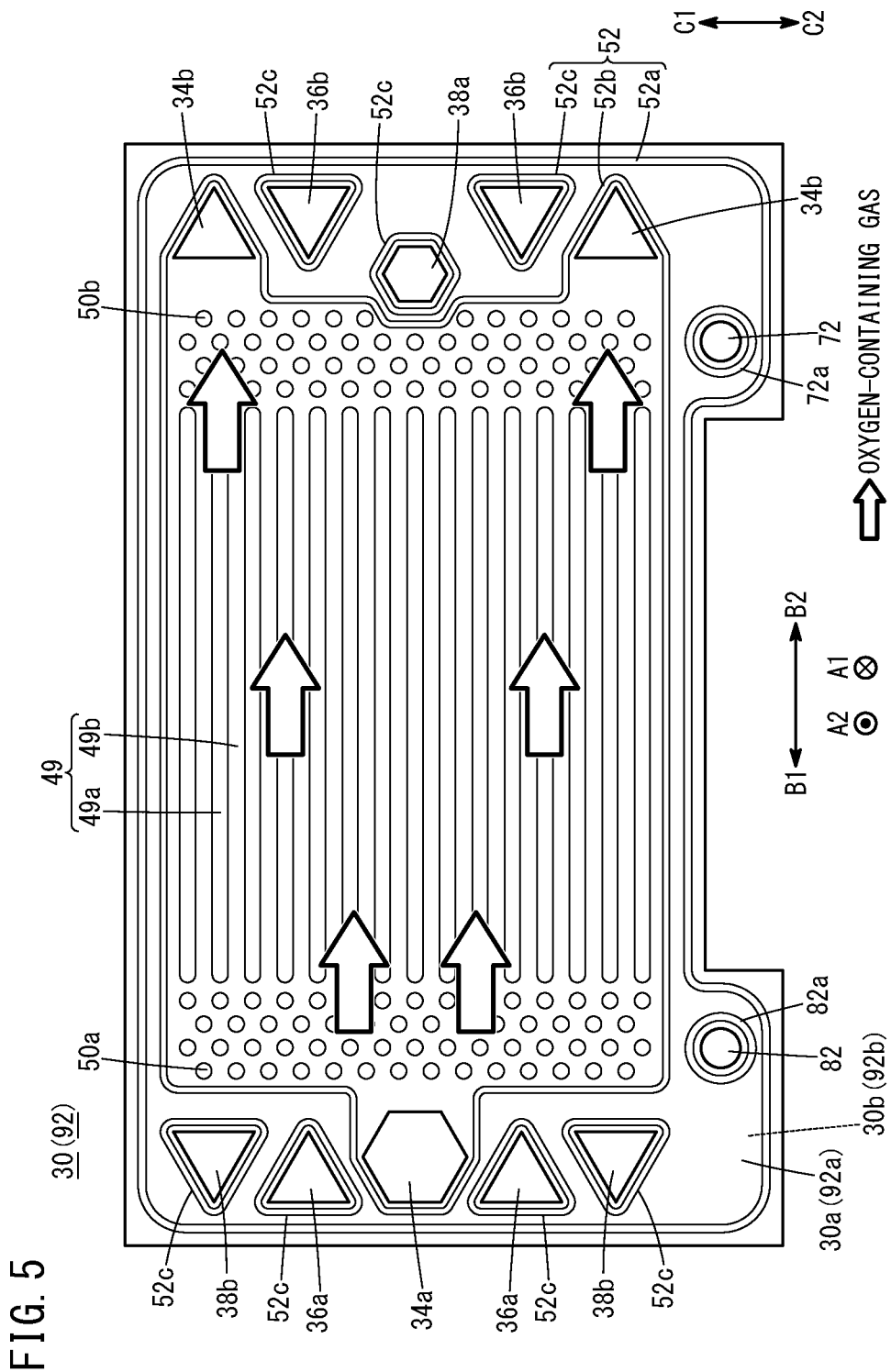
FIG. 5 is a front view showing an oxygen-containing gas flow field of a first separator and a dummy first separator.

As shown in FIG. 5, the first separator 30 has the oxygen-containing gas flow field 49 on its surface 30a facing the resin frame equipped MEA 28. For example, the oxygen-containing gas flow field 49 extends in the direction indicated by the arrows B1 and B2. The oxygen-containing gas flow field 49 is in fluid communication with the oxygen-containing gas supply passage 34a and the two oxygen-containing gas discharge passages 34b. The oxygen-containing gas flow field 49 includes straight flow grooves (or wavy flow grooves) 49b between a plurality of ridges 49a extending in the direction indicated by the arrows B1, B2.

An inlet buffer 50a is provided between the oxygen-containing gas supply passage 34a and the oxygen-containing gas flow field 49 by press forming. The inlet buffer 50a includes a plurality of bosses protruding toward the resin frame equipped MEA 28. An outlet buffer 50b is provided between the oxygen-containing gas discharge passage 34b and the oxygen-containing gas flow field 49 by press forming. The outlet buffer 50b includes a plurality of bosses protruding toward the resin frame equipped MEA 28.

A plurality of metal bead seals 52 are formed on the surface 30a of the first separator 30 by press forming. The metal bead seals 52 protrude toward the resin frame equipped MEA 28. Instead of the metal bead seals 52, protruding elastic seals made of elastic material may be provided. The plurality of metal bead seals 52 include an outer bead 52a, an inner bead 52b, and a plurality of passage beads 52c. The outer bead 52a is formed around the outer end of the surface 30a. The inner bead 52b is formed around the oxygen-containing gas flow field 49, the oxygen-containing gas supply passage 34a, and the two oxygen-containing gas discharge passages 34b, while allowing the oxygen-containing gas flow field 49 to be connected to the oxygen-containing gas supply passage 34a and the two oxygen-containing gas discharge passages 34b.

The plurality of passage beads 52c are formed around the fuel gas supply passage 38a, the two fuel gas discharge passages 38b, the two coolant supply passages 36a, and the two coolant discharge passages 36b. The outer bead 52a may be provided as necessary. The outer bead 52a may be dispensed with.

Figure 6:
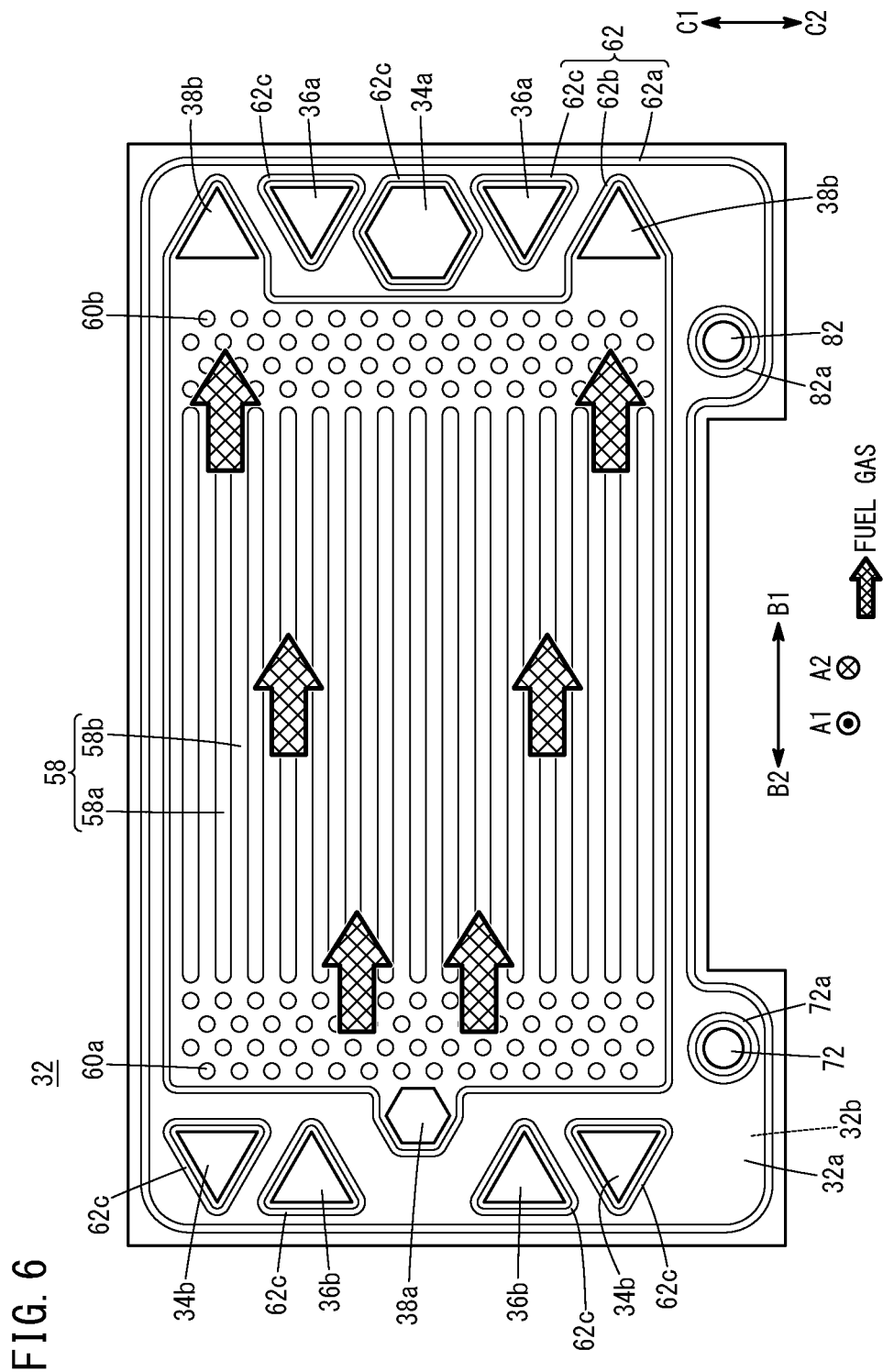
FIG. 6 is a front view showing a fuel gas flow field of a second separator.

As shown in FIG. 6, the second separator 32 has the fuel gas flow field 58 on its surface 32a facing the resin frame equipped MEA 28. For example, the fuel gas flow field 58 extends in the direction indicated by the arrows B1, B2. The fuel gas flow field 58 is in fluid communication with the fuel gas supply passage 38a and the two fuel gas discharge passages 38b. The fuel gas flow field 58 includes straight flow grooves (wavy flow grooves) 58b between a plurality of ridges 58a extending in the direction indicated by the arrows B1 and B2.

An inlet buffer 60a is provided between the fuel gas supply passage 38a and the fuel gas flow field 58 by press forming. The inlet buffer 60a includes a plurality of bosses protruding toward the resin frame equipped MEA 28. An outlet buffer 60b is provided between the fuel gas discharge passages 38b and the fuel gas flow field 58 by press forming. The outlet buffer 60b include a plurality of bosses protruding toward the resin frame equipped MEA 28.

A plurality of metal bead seals 62 are formed on the surface 32a of the second separator 32 by press forming.

The metal bead seals protrude toward the resin frame equipped MEA 28. Instead of the metal bead seals 62, protruding elastic seals made of elastic material may be provided. The plurality of metal bead seals 62 include an outer bead 62a, an inner bead 62b, and a plurality of passage beads 62c. The outer bead 62a is formed around the outer marginal portion of the surface 32a. The inner bead 62b is provided inside the outer bead 62a. The inner bead 62b is provided around the fuel gas flow field 58, the fuel gas supply passage 38a, and the two fuel gas discharge passages 38b, while allowing the fuel gas flow field 58 to be connected to the fuel gas supply passage 38a and the two fuel gas discharge passages 38b.

The plurality of passage beads 62c are formed around the oxygen-containing gas supply passage 34a, the two oxygen-containing gas discharge passages 34b, the two coolant supply passages 36a, and the two coolant discharge passages 36b. It should be noted that the outer bead 62a may be provided as necessary. The outer bead 62a may be dispensed with.

As shown in FIGS. 2 and 3, a coolant flow field 66 is formed between a surface 30b of the first separator 30 and a surface 32b of the second separator 32 that are joined together by welding or brazing. The coolant flow field 66 is in fluid communication with the coolant supply passages 36a and the coolant discharge passages 36b. When the first separator 30 and the second separator 32 are stacked with each other, the coolant flow field 66 is formed between the back surface of the oxygen-containing gas flow field 49 of the first separator 30 and the back surface of the fuel gas flow field 58 of the second separator 32.

As shown in FIG. 2, the first dummy cell 16 includes a resin frame equipped dummy assembly 90, and a dummy first separator 92 and a dummy second separator 94 (dummy separators) sandwiching the resin frame equipped dummy assembly 90. The dummy first separator 92 and the first separator 30 have the same structure. Therefore, as shown in FIG. 5, the dummy first separator 92 has an oxygen-containing gas flow field 49 on its surface 92a facing the resin frame equipped dummy assembly 90. The oxygen-containing gas flow field 49 is in fluid communication with the oxygen-containing gas supply passage 34a and the two oxygen-containing discharge passages 34b.

Figure 7:
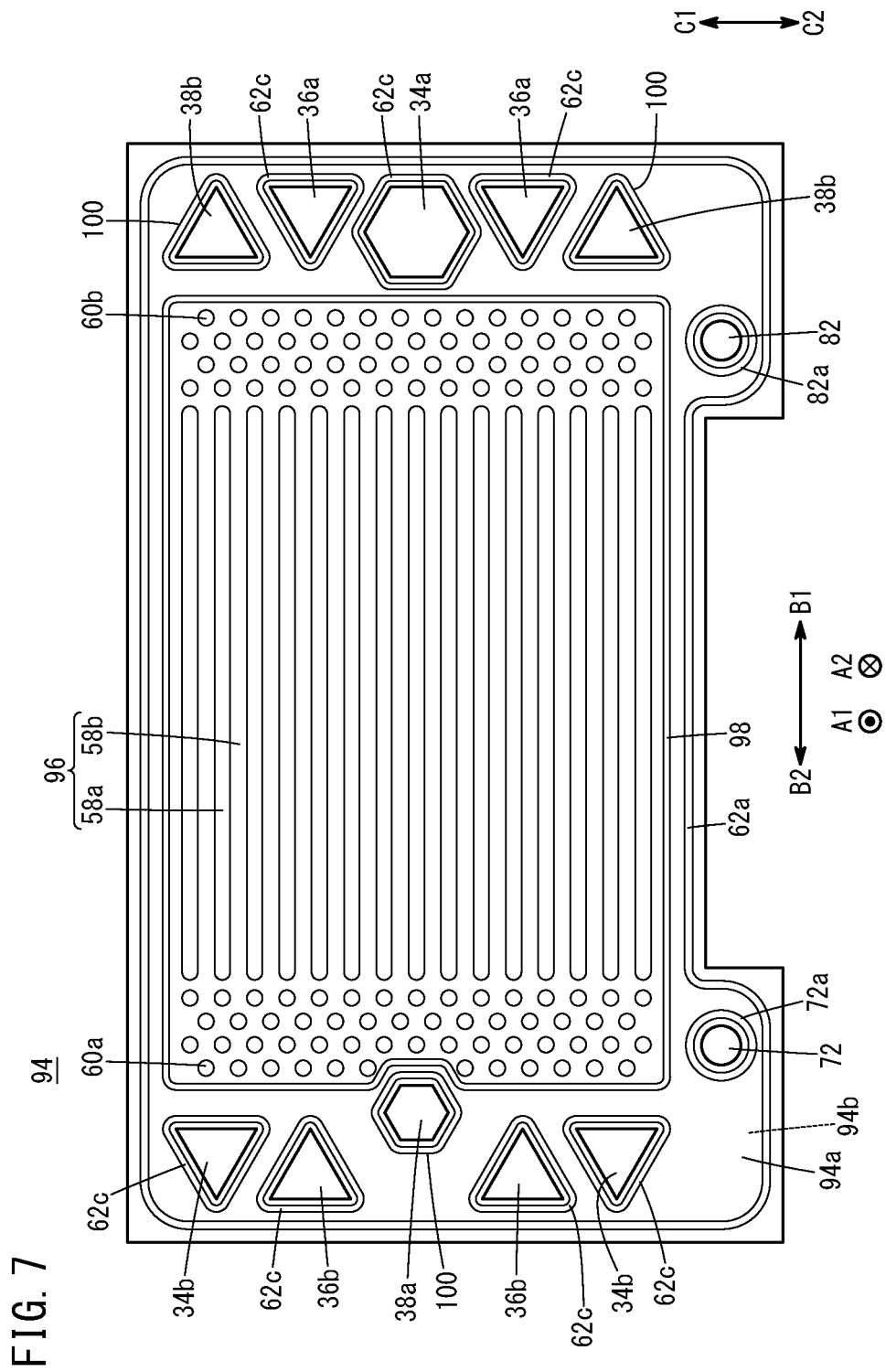
FIG. 7 is a front view showing a heat insulating space of a dummy second separator.

The dummy second separator 94 has the same structure as the second separator 32 except that, as shown in FIGS. 2 and 7, except that a heat insulating space 96 corresponding to the fuel gas flow field 58 (see FIG. 6) is formed on a surface 94a of the dummy second separator 94 facing the resin frame equipped dummy assembly 90. In the heat insulating space 96, fluid communication between the fuel gas supply passage 38a and the fuel gas discharge passages 38b is blocked. Specifically, as shown in FIG. 7, an inner bead 98 is formed on the surface 94a of the dummy second separator 94, around the heat insulating space 96, instead of the inner bead 62b (see FIG. 6) of the second separator 32. Further, passage beads 100 are provided on the surface 94a of the dummy second separator 94. The passage beads 100 are formed around the fuel gas supply passage 38a and the two fuel gas discharge passages 38b, respectively.

It should be noted that the dummy second separator 94 may be formed using the same separator as the second separator 32, and closing the spaces between the fuel gas flow field 58 and the fuel gas supply passage 38a and the two fuel gas discharge passages 38b, using liquid seals, etc.

The outer peripheries of the dummy first separator 92 and the dummy second separator 94 are joined together by welding, brazing, crimping, etc. to form a dummy joint separator 102. Further, a coolant flow field 66 is formed between a surface 92b of the dummy first separator 92 and a surface 94b of the dummy second separator 94 that are joined together. The coolant flow field 66 is in fluid communication with the coolant supply passages 36a and the coolant discharge passages 36b.

As shown in FIG. 2, since the dummy joint separator 102 adjacent to the stack body 14 of the first dummy cell 16 is formed by joining the dummy second separator 94 and the first separator 30 together, and the dummy joint separator 102 is shared with a power generation cell 12a provided at the end of the stack body 14 in the direction indicated by the arrow A1, the dummy joint separator 102 functions as the joint separator 33 as well.

Figure 8:
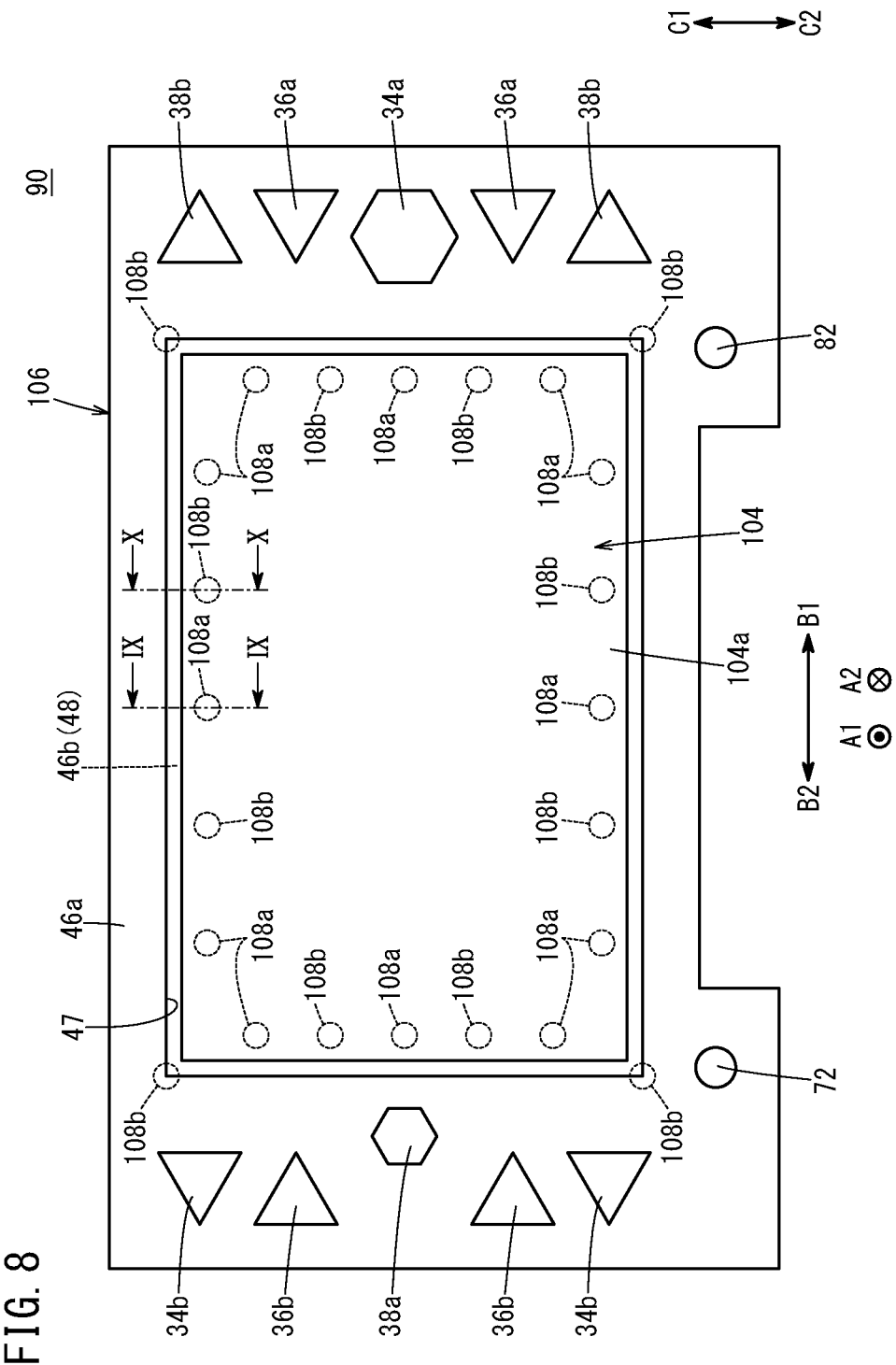
FIG. 8 is a front view showing a first electrically conductive porous sheet of a resin frame equipped dummy assembly.
Figure 9:
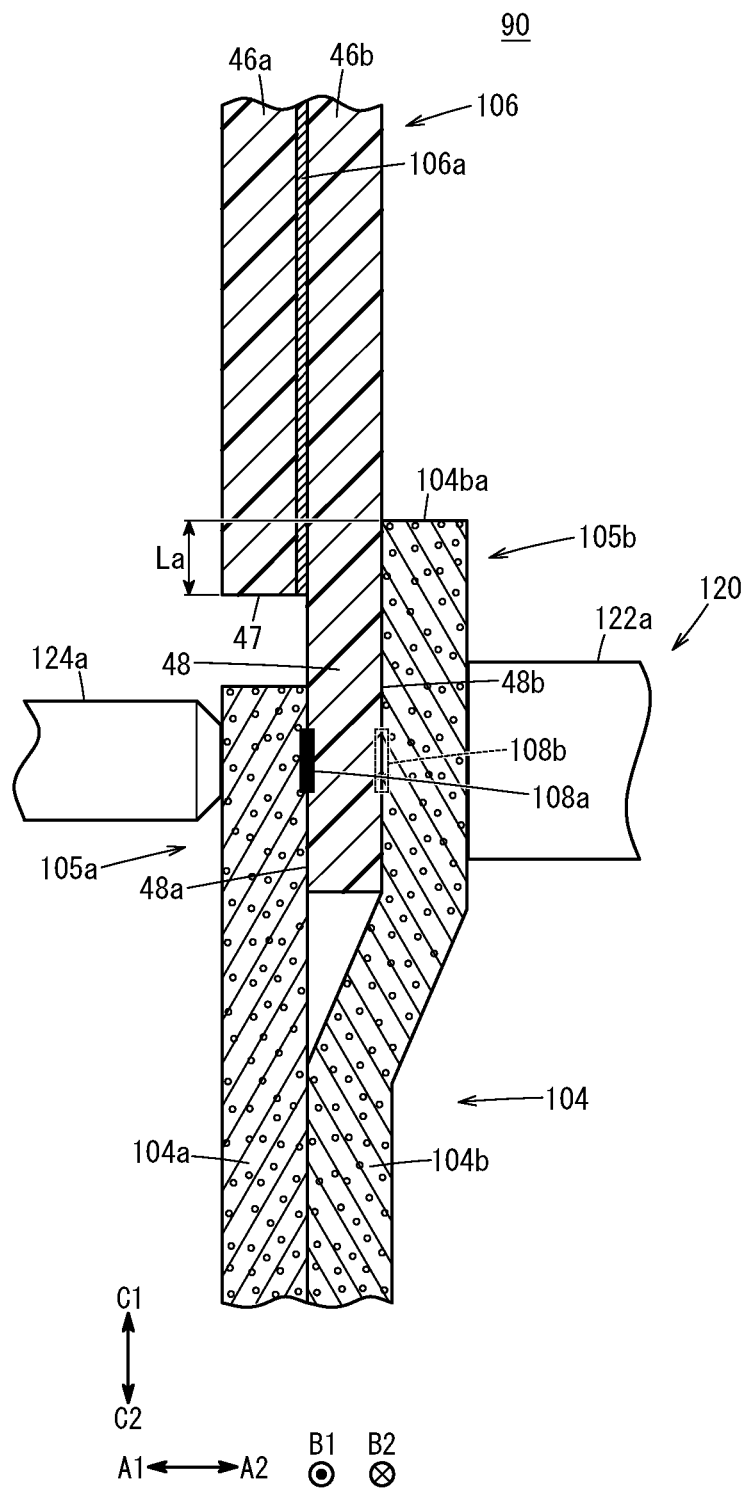
FIG. 9 is a cross sectional view taken along a line IX-IX in FIG. 8.

As shown in FIGS. 8 and 9, the resin frame equipped dummy assembly 90 includes a dummy assembly 104, and a dummy resin frame member 106 joined to the outer periphery of the dummy assembly 104, and provided around the outer periphery of the dummy assembly 104. As shown in FIG. 9, the dummy assembly 104 includes a first electrically conductive porous sheet 104a and a second electrically conductive porous sheet 104b as two electrically conductive porous sheets. In the embodiment of the present invention, the first electrically conductive porous sheet 104a and the second electrically conductive porous sheet 104b are directly stacked together without providing any adhesive layer, etc. between the first electrically conductive porous sheet 104a and the second electrically conductive porous sheet 104b. The portion of the first electrically conductive porous sheet 104a excluding its outer periphery and the portion of the second electrically conductive porous sheet 104b excluding its outer periphery may be joined together using an adhesive layer (not shown) interposed between the first electrically conductive porous sheet 104a and the second electrically conductive porous sheet 104b.

In the embodiment of the present invention, the first electrically conductive porous sheet 104a has the same structure as the cathode gas diffusion layer 44b of the membrane electrode assembly 28a of the power generation cell 12 (see FIG. 4). Further, the second electrically conductive porous sheet 104b has the same structure as the anode gas diffusion layer 42b of the membrane electrode assembly 28a of the power generation cell 12 (see FIG. 4). Therefore, the surface size of the second electrically conductive porous sheet 104b is larger than the surface size of the first electrically conductive porous sheet 104a. It should be noted that the first electrically conductive porous sheet 104a and the cathode gas diffusion layer 44b may have different material properties, sizes, and shapes. Further, the second electrically conductive porous sheet 104b and the anode gas diffusion layer 42b may have different material properties, sizes, and shapes.

As shown in FIGS. 4 and 9, the dummy resin frame member 106 has the same structure as the resin frame member 46 except that, instead of the adhesive layer 46c of the resin frame member 46, an adhesive layer 106a is formed. As shown in FIG. 9, the dummy resin frame member 106 is joined by the adhesive layer 106a which is present only in the stack surface where the first resin sheet 46a and the second resin sheet 46b face each other. An inner exposed portion 48 is provided inside the second resin sheet 46b. The inner exposed portion 48 extends inward beyond the inner end 47 of the first resin sheet 46a. As in the case of the adhesive layer 46c, the adhesive layer 106a may be provided over the entire surface of the second resin sheet 46b including the inner exposed portion 48.

Figure 10:
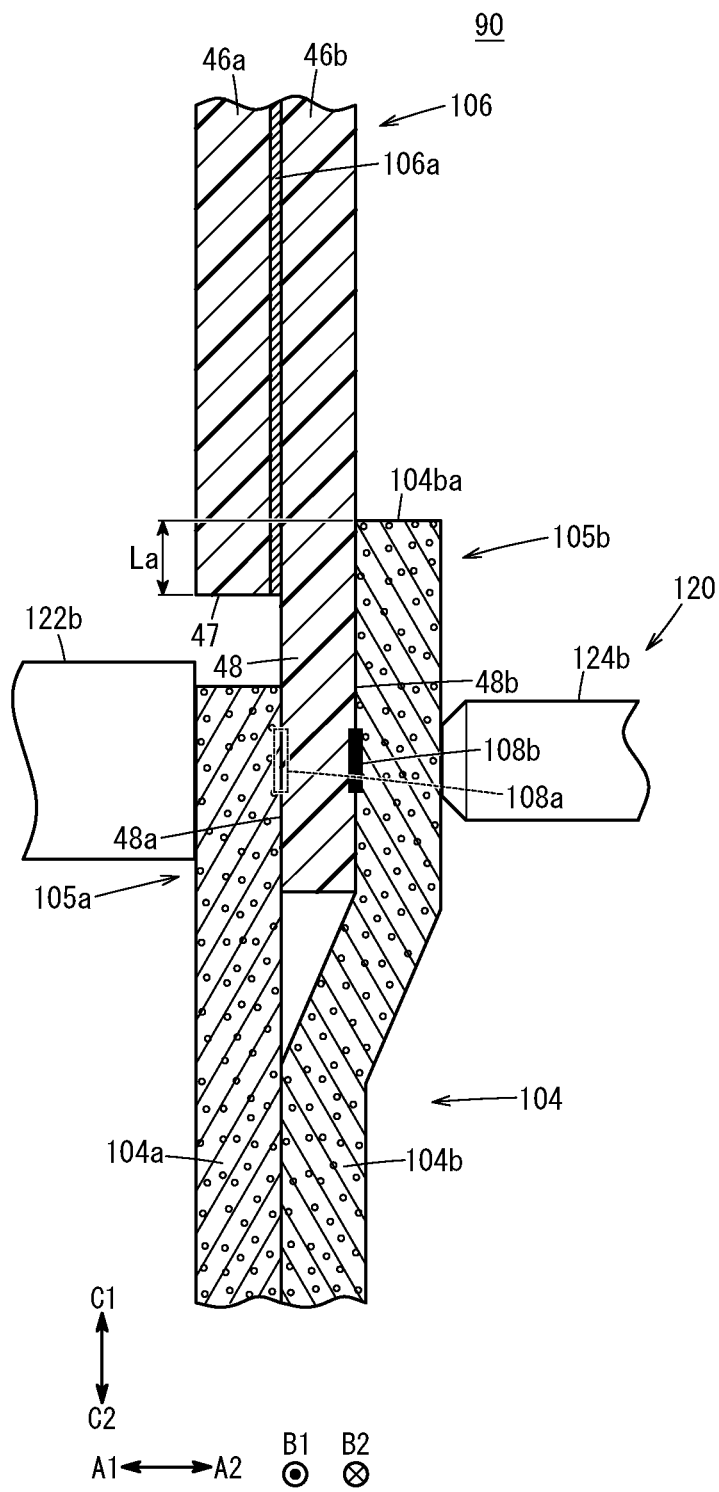
FIG. 10 is a cross sectional view taken along a line X-X in FIG. 8.

The inner exposed portion 48 of the dummy resin frame member 106 is interposed between the first electrically conductive porous sheet 104a and the second electrically conductive porous sheet 104b in the outer peripheral portion of the dummy assembly 104. In this regard, as shown in FIGS. 9 and 10, the inner marginal portion of the first resin sheet 46a includes a portion overlapped with an outer marginal portion of the second electrically conductive porous sheet 104b through the adhesive layer 106a and the second resin sheet 46b. Therefore, an outer end 104ba of the second electrically conductive porous sheet 104b is spaced outward from the inner end 47 of the first resin sheet 46a by the distance La.

A first heat welding portion 108a is provided in a stack part 105a where the surface 48a of the inner exposed portion 48 adjacent to the first electrically conductive porous sheet 104a and the first electrically conductive porous sheet 104a are stacked together. A second heat welding portion 108b is provided in a stack part 105b where a surface 48b of the inner exposed portion 48 facing the second electrically conductive porous sheet 104b and the second electrically conductive porous sheet 104b are stacked together.

The first heat welding portion 108a is formed by solidifying the molten resin of the inner exposed portion 48 which has entered pores of the first electrically conductive porous sheet 104a. Therefore, by the first heat welding portion 108a, the second resin sheet 46b and the first electrically conductive porous sheet 104a are joined together with sufficient joining strength. Likewise, the second heat welding portion 108b is formed by solidifying the molten resin of the inner exposed portion 48 which has entered pores of the second electrically conductive porous sheet 104b. Therefore, by the second heat welding portion 108b, the second resin sheet 46b and the second electrically conductive porous sheet 104b are joined together with sufficient joining strength. As a result of these processes, the dummy resin frame member 106 is provided around the dummy assembly 104.

As shown in FIG. 8, each of the first heat welding portion 108a and the second heat welding portion 108b (heat welding portions) is provided discontinuously (in a spot pattern) in the outer periphery of the dummy assembly 104. Further, the first heat welding portion 108a and the second heat welding portion 108b are provided alternately in the peripheral direction of the outer periphery of the dummy assembly 104. Further, as shown in FIG. 9, the first heat welding portion 108a and the second heat welding portion 108b are provided at different positions in the stacking direction indicated by the arrows A1 and A2.

As in the case of the first dummy cell 16, the second dummy cell 18 is formed by sandwiching the resin frame equipped dummy assembly 90 between the dummy first separator 92 and the dummy second separator 94.

As shown in FIG. 1, the fuel cell stack 10 includes a first drain 72 for discharging the water produced at the cathode in the fuel cell stack 10, and a second drain 82 for discharging the produced water from the anode in the fuel cell stack 10, during operation (power generation) of the fuel cell stack 10. As shown in FIGS. 3, and 5 to 8, the first drain 72 and the second drain 82 extend through the resin frame member 46, and each of the separators (the first separator 30, the second separator 32, the dummy first separator 92, the dummy second separator 94) in the stacking direction indicated by the arrows A1 and A2.

The first drain 72 is connected to the upper oxygen-containing gas discharge passage 34b through a first connection channel (not shown) provided at the end (e.g., insulator 22b) adjacent to the end plate 24b of the fuel cell stack 10. The first drain 72 is provided below the bottom of the lower oxygen-containing gas discharge passage 34b.

The second drain 82 is connected to the upper fuel gas discharge passage 38b through a second connection channel (not shown) provided at the end (e.g., insulator 22b) adjacent to the end plate 24b of the fuel cell stack 10. The second drain 82 is provided below the bottom of the lower fuel gas discharge passage 38b.

As shown in FIGS. 3, and 5 to 7, in each of the separators, bead seals 72a, 82a for preventing leakage of the produced water are provided in the outer peripheries of the first drain 72 and the second drain 82, respectively. The bead seals 72a, 82a protrude toward the adjacent resin frame equipped MEA 28 in the thickness direction of each separator, and are formed in a ring shape around the first drain 72 and or the second drain 82.

The fuel cell stack 10 has basically has the structure as described above. Hereinafter, a method of producing the dummy cell for the fuel cell stack according to the embodiment of the present invention will be described, taking an example where the first dummy cell 16 of the fuel cell stack 10 is obtained.

Firstly, a joining step of joining the dummy resin frame member 106 to the outer periphery of the dummy assembly 104 together is performed to obtaining the resin frame equipped dummy assembly 90. Specifically, in the joining step, as shown in FIG. 9 or 10, the inner exposed portion 48 of the dummy resin frame member 106 is interposed between the first electrically conductive porous sheet 104a and the second electrically conductive porous sheet 104b in the outer peripheral portion of the dummy assembly 104. At this time, as described above, the inner end 47 of the first resin sheet 46a and the outer marginal portion of the second electrically conductive porous sheet 104b are stacked together in a manner that the inner end 47 of the first resin sheet 46*a* and the outer end 104*ba* of the second electrically conductive porous sheet 104*b* are spaced from each other by the distance La.

In the embodiment of the present invention, at this time, none of the fuel gas passages, the oxygen-containing gas passages, and the coolant passages are provided in the marginal portion of the dummy resin frame member 106.

Then, by heat welding using a heat welding apparatus 120, a plurality of spots of the first heat welding portion 108*a* are formed in the stack part 105*a* where the surface 48*a* of the inner exposed portion 48 and the first electrically conductive porous sheet 104*a* are stacked together, discontinuously in the peripheral direction of the outer periphery of the dummy assembly 104. Further, a plurality of spots of the second heat welding portion 108*b* are formed in the stack part 105*b* where the surface 48*b* of the inner exposed portion 48 and the second electrically conductive porous sheet 104*b* are stacked together, discontinuously in the peripheral direction of the outer periphery of the dummy assembly 104.

The order of forming the first heat welding portion 108*a* and the second heat welding portion 108*b* is not limited specially. For example, a plurality of spots of the second heat welding portion 108*b* may be formed after forming all of a plurality of spots of the first heat welding portion 108*a*. Further, the spots of the first heat welding portion 108*a* and the second heat welding portion 108*b* may be formed alternately one by one to obtain the plurality of spots of the first heat welding portion 108*a* and the plurality of the spots of second heat welding portions 108*b* eventually. Further, the first heat welding portion 108*a* and the second heat welding portion 108*b* may be formed at the same time.

In the embodiment of the present invention, the heat welding apparatus 120 includes base frames 122*a*, 122*b*, and heating rods 124*a*, 124*b*. An electric heater, etc. can be used to heat, and increase the temperatures of the heating rods 124*a*, 124*b*.

In the case of forming the first heat welding portion 108*a* using the heat welding apparatus 120, for example, as shown in FIG. 9, a predetermined position of the stack part 105*a* is held between the base frame 122*a* and the heating rod 124*a* having the increased temperature to apply heat and pressure to the stack part 105*a*. At this time, the heating rod 124*a* is positioned adjacent to the first electrically conductive porous sheet 104*a* of the stack part 105*a*. In this manner, it is possible to transmit the heat of the heating rod 124*a* toward the surface 48*a* of the inner exposed portion 48 through the first electrically conductive porous sheet 104*a*. As a result, the molten resin produced by melting the inner exposed portion 48 enters pores of the first electrically conductive porous sheet 104*a*. Heating by the heating rod 124*a* is stopped to solidify the molten resin which entered the pores of the first electrically conductive porous sheet 104*a* to form the first heat welding portion 108*a*.

It should be noted that the heat welding apparatus 120 may include only one heating rod 124*a* to hold predetermined positions of the stack part 105*a* successively, and form the plurality of spots of the first heat welding portion 108*a* one by one with a small load. Further, for example, the heat welding apparatus 120 may include a plurality of heating rods 124*a*, and hold a plurality of or all of predetermined positions of the stack part 105*a* at the same time to form a plurality of spots of the first heat welding portion 108*a* at the same time efficiently.

In the case of forming the second heat welding portion 108*b* using the heat welding apparatus 120, for example, as shown in FIG. 10, a predetermined position of the stack part 105*b* is held between the base frame 122*b* and the heating rod 124*b* having the increased temperature to apply heat and pressure to the stack part 105*b*. At this time, the heating rod 124*b* is positioned adjacent to the second electrically conductive porous sheet 104*b* of the stack part 105*b*. In this manner, it is possible to transmit the heat of the heating rod 124*b* toward the surface 48*b* of the inner exposed portion 48 through the second electrically conductive porous sheet 104*b*. As a result, the molten resin produced by melting the inner exposed portion 48 enters pores of the second electrically conductive porous sheet 104*b*. Heating by the heating rod 124*b* is stopped to solidify the molten resin which entered the pores of the second electrically conductive porous sheet 104*b* to form the second heat welding portion 108*b*.

It should be noted that the heat welding apparatus 120 may include only one heating rod 124*b* to hold predetermined positions of the stack part 105*b* successively, and form the plurality of spots of the second heat welding portion 108*b* one by one with a small load. Further, for example, the heat welding apparatus 120 may include a plurality of heating rods 124*b*, and hold a plurality of or all of predetermined positions of the stack part 105*b* at the same time to form a plurality of spots of the second heat welding portion 108*b* at the same time efficiently.

In heat welding using the heat welding apparatus 120 the holding position between the base frame 122*a* and the heating rod 124*a* in the stack part 105*a* and the holding position between the base frame 122*b* and the heating rod 124*b* in the stack part 105*b* are adjusted, respectively. In this manner, it is possible to adjust the layout of the first heat welding portion 108*a* and the second heat welding portion 108*b*. In this manner, as shown in FIG. 8, the spots of the first heat welding portion 108*a* and the second heat welding portion 108*b* are positioned alternately in the peripheral portion of the outer periphery of the dummy assembly 104, and as shown in FIGS. 9 and 10, at different positions in the stacking direction indicated by the arrows A1 and A2.

In the embodiment of the present invention, each of the contact surfaces where the heating rods 124*a*, 124*b* contact the stack parts 105*a*, 105*b* has a circular shape, and as shown in FIG. 8, using the heating rods 124*a*, 124*b*, the first heat welding portion 108*a* and the second heat welding portion 108*b* each having a circular shape in a plan view are formed. However, the shape of the contact surfaces of the heating rods 124*a*, 124*b* and the shape of the first heat welding portion 108*a* and the second heat welding portion 108*b* in a plan view are not limited to the circular shape specially. The contact surfaces of the heating rods 124*a*, 124*b* and the first heat welding portion 108*a* and the second heat welding portion 108*b* may have a rectangular shape or any polygonal shape. Further, instead of the heat welding apparatus 120, any of various heating apparatuses (not shown) such as a laser heating apparatus may be used to form the first heat welding portion 108*a* and the second heat welding portion 108*b*.

Further, in the heat welding apparatus 120 according to the embodiment of the present invention, the second heat welding portion 108*b* is formed by the base frame 122*b* and the heating rod 124*b* which are provided separately from the base frame 122*a* and the heating rod 124*a* used for forming the first heat welding portion 108*a*. However, the present invention is not limited in this respect specially. For example, in the heat welding apparatus 120, the base frame 122*a* and the heating rod 124*a* may be used in common to form both of the first heat welding portion 108*a* and the second heat welding portion 108*b*. In this case, at the time of forming the first heat welding portion 108a, the heating rod 124a is positioned adjacent to the first electrically conductive porous sheet 104a of the stack part 105a. On the other hand, in the case of forming the second heat welding portion 108b, the heating rod 124a is positioned adjacent to the second electrically conductive porous sheet 104b of the stack part 105b.

Next, the fuel gas passages, the oxygen-containing gas passages, and the coolant passages are formed respectively, in the marginal portion of the dummy resin frame member 106 of the resin frame equipped dummy assembly 90 obtained as described above, to have the above layout.

Next, as shown in FIG. 2, a stacking step of holding the resin frame equipped dummy assembly 90 between the dummy joint separators 102 is performed. Specifically, the resin frame equipped dummy assembly 90 is held between the dummy joint separators 102 in a manner that the surface 92a of the dummy first separator 92 is positioned adjacent to the first electrically conductive porous sheet 104a of the resin frame equipped dummy assembly 90, and the surface 94a of the dummy second separator 94 is positioned adjacent to the second electrically conductive porous sheet 104b of the resin frame equipped dummy assembly 90. In this manner, it is possible to obtain the first dummy cell 16. It should be noted that the second dummy cell 18 can be obtained in the same manner as in the case of the first dummy cell 16.

Hereinafter, operation of the fuel cell stack 10 having the first dummy cell 16 and the second dummy cell 18 obtained as described above will be described.

Firstly, as shown in FIG. 1, an oxygen-containing gas (e.g., the air) is supplied to the oxygen-containing gas supply passage 34a (inlet 35a) of the end plate 24a. A fuel gas such as a hydrogen-containing gas is supplied to the fuel gas supply passage 38a (inlet 39a) of the end plate 24a. A coolant such as pure water ethylene glycol, or oil is supplied to the coolant supply passages 36a (inlet 37a) of the end plate 24a.

As shown in FIG. 5, the oxygen-containing gas flows from the oxygen-containing gas supply passage 34a into the oxygen-containing gas flow field 49 of the first separator 30 and the dummy first separator 92. The oxygen-containing gas flows along the oxygen-containing gas flow field 49 in the direction indicated by the arrows B1 and B2, and the oxygen-containing gas is supplied to the cathode 44 of the membrane electrode assembly 28a and the dummy assembly 104.

As shown in FIG. 6, the fuel gas flows from the fuel gas supply passage 38a into the fuel gas flow field 58 of the second separator 32. The fuel gas flows along the fuel gas flow field 58 in the direction indicated by the arrows B1, B2, and the fuel gas is supplied to the anode 42 of the membrane electrode assembly 28a.

In this regard, as shown in FIG. 7, in the heat insulating space 96 of the dummy second separator 94, the flow of the fuel gas is blocked by the inner bead 98 formed around the heat insulating space 96 and the passage beads 100 formed around the fuel gas supply passage 38a and the two fuel gas discharge passages 38b.

In each of the membrane electrode assemblies 28a of the stack body 14, the oxygen-containing gas supplied to the cathode 44 and the fuel gas supplied to the anode 42 are partially consumed in electrochemical reactions in the cathode catalyst layer 44a and the anode catalyst layer 42a to generate electricity.

Then, as shown in FIG. 3, the oxygen-containing gas supplied to the cathode 44 is partially consumed at the cathode 44, and then, discharged along the oxygen-containing gas discharge passages 34b in the direction indicated by the arrows A1 and A2. Likewise, the fuel gas supplied to the anode 42 is partially consumed at the anode 42, and then, discharged along the fuel gas discharge passages 38b in the direction indicated by the arrows A1 and A2.

Further, the coolant supplied to the coolant supply passages 36a flows into the coolant flow field 66 formed in each space between the first separator 30 and the second separator 32, between the first separator 30 and the dummy second separator 94, and between the dummy first separator 92 and the dummy second separator 94, and then, the coolant flows in the direction indicated by the arrows B1 and B2. After the coolant cools the membrane electrode assembly 28a, the coolant is discharged from the coolant discharge passages 36b.

As described above, in each of the dummy cells (the first dummy cell 16 and the second dummy cell 18) of the fuel cell stack 10 according to the embodiment of the present invention, the dummy resin frame member 106 is joined to the first heat welding portion 108a and the second heat welding portion 108b (heat welding portions) around the dummy assembly 104. In the structure, unlike the case where the dummy resin frame member 106 and the dummy assembly 104 are joined together by adhesive (not shown), the adhesive does not stick out from the dummy resin frame member 106 and the dummy assembly 104, and positional displacement of the adhesive does not occur. The dummy resin frame member 106 and the dummy assembly 104 can be joined together by a small joining margin with high degrees of accuracy and strength.

As a result, it becomes possible to improve the quality of each of the dummy cells and reduce the size of each of the dummy cells. Further, since the time for hardening the adhesive is not required, it is possible to improve the production efficiency of each of the dummy cells, and reduce the production cost. Further, in the dummy cell where the dummy resin frame member 106 and the dummy assembly 104 are joined together by the first heat welding portion 108a and the second heat welding portion 108b provided discontinuously in a spot pattern as describe above, unlike the dummy cell where the dummy resin frame member 106 and the dummy assembly 104 are joined together by adhesive provided continuously in the outer end of the dummy assembly 104, it is possible to reduce the energization loss which may occur during power generation of the fuel cell stack 10.

As described above, in each of the dummy cells formed by joining the first electrically conductive porous sheet 104a and the second electrically conductive porous sheet 104b together, since the electrolyte membrane 40 and the electrode catalyst layers 42a, 44a are not provided, power generation is not performed, and water is not produced in power generation. Therefore, each of the dummy cells functions as a heat insulating layer, and it is possible to suppress water condensation in the dummy cells. As described above, each of the dummy cells is provided at one end of the stack body 14 in the stacking direction. In this manner, it is possible to improve the heat insulating performance at the end of the stack body 14. Therefore, even under the environment at low temperature, it is possible to suppress decrease in the temperature at the ends of the stack body 14 in comparison with the central position of the stack body 14. That is, it is possible to improve the power generation stability.

Further, since it is possible to improve the heat insulating performance at the end of the stack body 14, even in the case where operation of the fuel cell stack 10 is started below the freezing temperature, it is possible to increase the entire temperature of the stack body 14 suitably. In the structure, it is possible to eliminate or suppress situations where freezing of the water produced in power generation occurs at the end of the stack body 14 to cause decrease in the voltage.

Therefore, in the fuel cell stack 10, using each of the dummy cells obtained with high quality at low cost, it is possible to improve the power generation stability.

In the fuel cell stack 10, the oxygen-containing gas in the humidified state is supplied to the inlet 35a of the oxygen-containing gas supply passage 34a. When water in the oxygen-containing gas is condensed and condensed water in the liquid state is produced, and the condensed water is splashed into the power generation cell 12, the performance of diffusing the fuel gas and the oxygen-containing gas may be degraded undesirably.

In the fuel cell stack 10, the first dummy cell 16 and the second dummy cell 18 are provided at the inlet 35a of the oxygen-containing gas supply passage 34a in the direction indicated by the arrow A1, and the oxygen-containing gas flow field 49 as the passage of the oxygen-containing gas is provided in these dummy cells. Therefore, even in the case where the oxygen-containing gas contains the condensed water, the condensed water can be collected by the dummy cells. As a result, since it is possible to suppress splashing of the condensed water into the power generation cell 12, it becomes possible to improve the power generation stability of the fuel cell stack 10.

In contrast, in the embodiment of the present invention, the heat insulating space 96 is provided in each of the dummy cells, and the fuel gas does not flow in the heat insulating space 96. In the structure, it is possible to improve the heat insulating performance by each of the dummy cells, and decrease the fuel gas which does not contribute electrochemical reactions in power generation, and which is discharged from the fuel cell stack 10.

As described above, in the fuel cell stack 10, both surfaces 48a, 48b of the inner exposed portion 48 and the first electrically conductive porous sheet 104a and the second electrically conductive porous sheet 104b are joined together by the first heat welding portion 108a and the second heat welding portion 108b, respectively. Therefore, it is possible to join the dummy resin frame member 106 and the dummy assembly 104 together with high strength to a greater extent. It should be noted that one of the first heat welding portion 108a and the second heat welding portion 108b may be used to join the dummy resin frame member 106 and the dummy assembly 104 together.

Further, the first heat welding portion 108a and the second heat welding portion 108b are provided discontinuously in the outer periphery of the dummy assembly 104. In this case, in comparison with the case where the first heat welding portion 108a and the second heat welding portion 108b are provided continuously in the outer periphery of the dummy assembly 104, it is possible to obtain each of the dummy cells efficiently in simple steps.

As described above, in the fuel cell stack 10, the first heat welding portion 108a and the second heat welding portion 108b are provided at different positions in the stacking direction. In this case, for example, in comparison with the case where the first heat welding portion 108a and the second heat welding portion 108b are provided at the same position in the stacking direction, it is possible to suppress partial increase in the thickness of each of the dummy cells. Even if the dummy cells are stacked on the power generation cells 12, since it is possible to suppress local increase in the surface pressure in the power generation cells 12, it is possible to suppress formation of creeps in the electrolyte membrane 40, and improve the durability of the electrolyte membrane 40.

Further, the first heat welding portions 108a and the second heat welding portions 108b are provided alternately in the peripheral direction of the dummy assembly 104. In this case, the dummy assembly 104 and the dummy resin frame member 106 can be joined together with sufficient strength in simple joining steps. Further, it is possible to effectively suppress local increase in the surface pressures of the power generation cells 12 stacked on the dummy cells.

In the fuel cell stack 10, as described above, since the joining margin for joining the dummy resin frame member 106 and the dummy assembly 104 is reduced, it is possible to determine the design of providing the oxygen-containing gas passages and the fuel gas passages in the outer periphery of the dummy resin frame member 106 more freely.

As described above, in the fuel cell stack 10, the dummy resin frame member 106 and the resin frame member 46 have the same structure. In this case, the dummy resin frame member 106 of each of the dummy cells is used in common by resin frame member 46 of the power generation cell 12. Therefore, each of the dummy cells can have even more simple and economical structure. It should be noted that the dummy resin frame member 106 and the resin frame member 46 may have different material properties, sizes, and shapes.

Further, the first electrically conductive porous sheet 104a and the cathode gas diffusion layer 44b have the same structure, and the second electrically conductive porous sheet 104b and the anode gas diffusion layer 42b have the same structure. In this case, the first electrically conductive porous sheet 104a and the second electrically conductive porous sheet 104b of each of the dummy cells have structure in common with the cathode gas diffusion layer 44b and the anode gas diffusion layer 42b of the power generation cell 12. Therefore, each of the dummy cells can have even more simple and economical structure.

The present invention is not limited to the above described embodiment. Various modifications may be made without departing from the gist of the present invention.

For example, as long as the first heat welding portion 108a and the second heat welding portion 108b are provided at different positions in the stacking direction, the shapes and the numbers of the first heat welding portion(s) 108a and the second heat welding portion(s) 108b, and the other layout relative to the stack part 105a, 105b are not limited specially to the above described embodiment. For example, the first heat welding portion 108a and the second heat welding portion 108b may be provided at different positions in at least one of the direction indicated by the arrows C1, C2 and the direction indicated by the arrows B1, B2. Further, the first heat welding portion 108a and the second heat welding portion 108b may not be provided alternately in the outer periphery of the dummy assembly 104. The first heat welding portion 108a and the second heat welding portion 108b may be provided continuously in the outer periphery of the dummy assembly 104, respectively.

In the embodiment, the dummy resin frame member 106 is formed by stacking the first resin sheet 46a and the second resin sheet 46b together. However, the present invention is not limited in this respect. For example, the dummy resin frame member 106 may be formed of a single frame shaped resin sheet (not shown).

Even in the case where the dummy resin frame member 106 is formed of a single resin sheet, the dummy resin frame member 106 and the dummy assembly 104 are joined together by the first heat welding portion 108a and the second heat welding portion 108b provided in the same manner as the above described embodiment. That is, for example, the first heat welding portion 108a may be formed in the stack part where one surface in the inner periphery of the dummy resin frame member 106 and the outer periphery of the first electrically conductive porous sheet 104a are stacked together. Further, the second heat welding portion 108b may be formed in the stack part where the other surface in the inner periphery of the dummy resin frame member 106 and the outer periphery of the second electrically conductive porous sheet 104b are stacked together. Therefore, the dummy cell including the dummy resin frame member 106 formed of a single resin sheet also offers the same working effects and advantages as in the case of the dummy cell including the dummy resin frame member 106 formed of the first resin sheet 46a and the second resin sheet 46b.

Further, the resin frame member 46 may be formed of a single frame shaped resin sheet as well. Also in this case, it is possible to join the resin frame member 46 to the membrane electrode assembly 28a in the same manner as in the case where the resin frame member 46 are formed of the first resin sheet 46a and the second resin sheet 46b.

In the method of producing the dummy cell according to the embodiment of the present invention, the fuel gas passages, the oxygen-containing gas passages, and the coolant passages are formed in the marginal portion of the dummy resin frame member 106 after the joining step, and before the stacking step. However, the present invention is not limited in this respect. For example, the fluid passages may be formed in the marginal portion of the dummy resin frame member 106 before the joining step.

In the fuel cell stack 10 according to the embodiment of the present invention, two dummy cells (the first dummy cell 16 and the second dummy cell 18) are stacked together at the end of the stack body 14 in the direction indicated by the arrow A1. As described above, the dummy cell is provided on the side of the stack body 14 indicated by the arrow A1, i.e., at the inlet of the oxygen-containing gas. In this manner, it becomes possible to effectively suppress entry of the condensed water into the power generation cell 12 to a greater extent. However, in the fuel cell stack 10, the dummy cell may be provided at the end of the stack body 14 in the stacking direction indicated by the arrow A2. The dummy cells may be provided at both ends in the stacking direction. Further, the number of the dummy cells is not limited to two. Only one dummy cell may be provided, or more than two dummy cells may be provided.

The embodiment of the present invention adopts so called cell-by-cell cooling structure where each of cell units is formed by sandwiching a membrane electrode assembly between two metal separators, and a coolant flow field is formed between the adjacent unit cells. Alternatively, it may be possible to adopt so called skip cooling structure where each of cell units includes three or more metal separators and two or more membrane electrode assemblies, the cell unit is formed by stacking the metal separators and the membrane electrode assemblies alternately, and a coolant flow field is formed between the adjacent unit cells.

The present invention is not limited to the above described embodiments. It is a matter of course that various structures may be adopted without deviating from the gist of the present invention.

What is claimed is:

1. A fuel cell stack comprising:
a stack body comprising a plurality of power generation cells stacked together in a stacking direction, the power generation cells each including a membrane electrode assembly including an electrolyte membrane and electrodes having gas diffusion layers of electrically conductive porous sheets on both sides of an electrolyte membrane, a resin frame member provided around the membrane electrode assembly, and separators sandwiching the membrane electrode assembly; and
a dummy cell provided at least at one end of the stack body in the stacking direction, wherein the dummy cell includes a dummy assembly corresponding to the membrane electrode assembly, a dummy resin frame member provided around the dummy assembly, and dummy separators sandwiching the dummy assembly, wherein the dummy assembly includes two electrically conductive porous sheets that are stacked together with the dummy resin frame member being sandwiched between the two electrically conductive porous sheets of the dummy assembly, wherein the dummy resin frame member is formed of at least a single frame shaped resin sheet; and wherein the dummy resin frame member and the dummy assembly are joined together by a heat welding portion provided discontinuously in a stack part where at least one of surfaces the dummy resin frame member and an outer periphery of the electrically conductive porous sheets are stacked together.

2. The fuel cell stack according to claim 1, wherein the dummy resin frame member includes two frame shaped resin sheets that are stacked together, and an inner periphery of one of the resin sheets extends inward beyond an inner end of another of the resin sheets, and wherein the heat welding portion is provided discontinuously in a stack part where at least one of surfaces of the inner periphery of the one of the resin sheets and the outer periphery of the electrically conductive porous sheets are stacked together.

3. The fuel cell stack according to claim 1, wherein:
an inner periphery of the dummy resin frame member is interposed between two electrically conductive porous sheets that are stacked together, and
the heat welding portion comprises:
a first heat welding portion provided in a stack part where one surface of an inner periphery of the dummy resin frame member and an outer periphery of the one of the electrically conductive porous sheets are stacked together; and
a second heat welding portion provided in a stack part where another surface of the inner periphery of the dummy resin frame member and an outer periphery of another of the electrically conductive porous sheets are stacked together.

4. The fuel cell stack according to claim 3, wherein the first heat welding portion and the second heat welding portion are provided at different positions in the stacking direction.

5. The fuel cell stack according to claim 4, wherein the first heat welding portion and the second heat welding portion are provided alternately in a peripheral direction of an outer periphery of the electrically conductive porous sheets.

6. The fuel cell stack according to claim 1, wherein the dummy resin frame member has same structure as the resin frame member of the power generation cell.

7. The fuel cell stack according to claim 1, wherein:
one of the electrically conductive porous sheets has same structure as the gas diffusion layer provided in one side of the electrolyte membrane of the power generation cell; and
another of the electrically conductive porous sheets has same structure as the gas diffusion layer provided in another side of the electrolyte membrane of the power generation cell.

8. A dummy cell for a fuel cell stack, the fuel cell stack comprising:
a stack body comprising a plurality of power generation cells stacked together in a stacking direction, wherein the power generation cells each comprise:
a membrane electrode assembly including an electrolyte membrane and electrodes having gas diffusion layers of electrically conductive porous sheets on both sides of an electrolyte membrane,
a resin frame member provided around the membrane electrode assembly, and separators sandwiching the membrane electrode assembly; and
a dummy cell provided at least at one end of the stack body in the stacking direction, wherein the dummy cell comprises:
a dummy assembly corresponding to the membrane electrode assembly,
a dummy resin frame member provided around the dummy assembly, and
dummy separators sandwiching the dummy assembly, and
wherein:
the dummy assembly includes two electrically conductive porous sheets that are stacked together;
the dummy resin frame member is formed of at least a single frame shaped resin sheet sandwiched between the two electrically conductive porous sheets of the dummy assembly; and
the dummy resin frame member and the dummy assembly are joined together by a heat welding portion provided discontinuously in a stack part where at least one of surfaces the dummy resin frame member and an outer periphery of the electrically conductive porous sheets are stacked together.

9. The dummy cell for the fuel cell stack according to claim 8, wherein the dummy resin frame member includes two frame shaped resin sheets that are stacked together, and an inner periphery of one of the resin sheets extends inward beyond an inner end of another of the resin sheets, and wherein the heat welding portion is provided discontinuously in a stack part where at least one of surfaces of the inner periphery of the one of the resin sheets and the outer periphery of the electrically conductive porous sheets are stacked together.

10. The dummy cell for the fuel cell stack according to claim 8, wherein an inner periphery of the dummy resin frame member is interposed between two electrically conductive porous sheets that are stacked together, and wherein the heat welding portion comprises:
a first heat welding portion provided in a stack part where one surface of an inner periphery of the dummy resin frame member and an outer periphery of the one of the electrically conductive porous sheets are stacked together; and
a second heat welding portion provided in a stack part where another surface of the inner periphery of the dummy resin frame member and an outer periphery of another of the electrically conductive porous sheets are stacked together.

11. The dummy cell for the fuel cell stack according to claim 10, wherein the first heat welding portion and the second heat welding portion are provided at different positions in the stacking direction.

12. The dummy cell for the fuel cell stack according to claim 11, wherein the first heat welding portion and the second heat welding portion are provided alternately in a peripheral direction of an outer periphery of the electrically conductive porous sheets.

13. The dummy cell for the fuel cell stack according to claim 8, wherein the dummy resin frame member has same structure as the resin frame member of the power generation cell.

14. The dummy cell for the fuel cell stack according to claim 8, wherein:
one of the electrically conductive porous sheets has same structure as the gas diffusion layer provided in one side of the electrolyte membrane of the power generation cell; and
another of the electrically conductive porous sheets has same structure as the gas diffusion layer provided in another side of the electrolyte membrane of the power generation cell.

* * * * *